United States Patent
Bordes et al.

(10) Patent No.: US 9,806,914 B1
(45) Date of Patent: Oct. 31, 2017

(54) SUCCESSIVE SIGNAL INTERFERENCE MITIGATION

(71) Applicant: UHNDER, INC., Austin, TX (US)

(72) Inventors: Jean P. Bordes, St. Charles, MO (US);
Aria Eshraghi, Austin, TX (US);
David S. Trager, Buda, TX (US);
Murtaza Ali, Cedar Park, TX (US);
Raghunath K. Rao, Austin, TX (US)

(73) Assignee: UHNDER, INC., Austin, TX (US)

( * ) Notice: Subject to any disclaimer, the term of this patent is extended or adjusted under 35 U.S.C. 154(b) by 0 days.

(21) Appl. No.: 15/491,193

(22) Filed: Apr. 19, 2017

Related U.S. Application Data

(60) Provisional application No. 62/381,808, filed on Aug. 31, 2016, provisional application No. 62/327,005, filed on Apr. 25, 2016.

(51) Int. Cl.
*G01S 13/42* (2006.01)
*H04L 25/03* (2006.01)
(Continued)

(52) U.S. Cl.
CPC ....... *H04L 25/03006* (2013.01); *H04B 7/145* (2013.01); *H04L 49/3063* (2013.01)

(58) Field of Classification Search
CPC ............... G01S 13/42; G01S 13/931; G01S 2013/0245; G01S 7/2813; G01S 7/292; G01S 13/48; G01S 13/685
(Continued)

(56) References Cited

U.S. PATENT DOCUMENTS

| 1,882,128 A | 10/1932 | Fearing |
| 3,374,478 A | 3/1968 | Blau |

(Continued)

FOREIGN PATENT DOCUMENTS

| EP | 0725480 | 11/2011 |
| EP | 2821808 | 7/2015 |

(Continued)

OTHER PUBLICATIONS

Chambers et al., "An article entitled" Real-Time Vehicle Mounted Multistatic Ground Penetrating Radar Imaging System for Buried Object Detection, Lawrence Livermore National Laboratory Reports (LLNL-TR-615452), Feb. 4, 2013; Retrieved from the Internet from https://e-reports-ext.llnl.gov/pdf/711892.pdf.

(Continued)

*Primary Examiner* — Timothy A Brainard
(74) *Attorney, Agent, or Firm* — Gardner Linn Burkhart & Flory

(57) ABSTRACT

A radar sensing system for a vehicle includes a transmitter, a receiver, and an interference mitigation processor. The transmitter transmits radio signals. The receiver receives radio signals. The received radio signals include reflected radio signals that are each transmitted radio signals reflected from objects in the environment. The receiver also down-converts and digitizes the received radio signals to produce a baseband sampled stream. The interference mitigation processor produces a second received radio signal that includes reflected radio signals that are transmitted radio signals reflected from a first object. The interference mitigation processor uses the second received radio signal to remove selected samples from the baseband sampled stream that are attributed to radio signals reflected from the first object to produce a modified baseband sampled stream. The (Continued)

receiver uses the modified baseband sampled stream to detect a second object more distant than the first object.

20 Claims, 25 Drawing Sheets

(51) Int. Cl.
*H04B 7/145* (2006.01)
*H04L 12/935* (2013.01)

(58) Field of Classification Search
USPC .................................................. 342/147
See application file for complete search history.

(56) References Cited

U.S. PATENT DOCUMENTS

| | | | |
|---|---|---|---|
| 3,735,395 A | 5/1973 | Ross | |
| 3,750,169 A | 7/1973 | Strenglein | |
| 3,896,434 A | 7/1975 | Sirven | |
| 4,176,351 A | 11/1979 | De Vita et al. | |
| 4,939,685 A | 7/1990 | Feintuch | |
| 5,034,906 A | 7/1991 | Chang | |
| 5,087,918 A | 2/1992 | May et al. | |
| 5,151,702 A | 9/1992 | Urkowitz | |
| 5,175,710 A | 12/1992 | Hutson | |
| 5,218,619 A | 6/1993 | Dent | |
| 5,280,288 A | 1/1994 | Sherry et al. | |
| 5,341,141 A | 8/1994 | Frazier et al. | |
| 5,345,470 A | 9/1994 | Alexander | |
| 5,657,023 A | 8/1997 | Lewis et al. | |
| 5,724,041 A | 3/1998 | Inoue et al. | |
| 5,892,477 A | 4/1999 | Wehling | |
| 5,917,430 A | 6/1999 | Greneker, III et al. | |
| 5,920,285 A | 7/1999 | Benjamin | |
| 5,931,893 A | 8/1999 | Dent et al. | |
| 5,959,571 A | 9/1999 | Aoyagi et al. | |
| 6,067,314 A | 5/2000 | Azuma | |
| 6,069,581 A | 5/2000 | Bell et al. | |
| 6,121,872 A | 9/2000 | Weishaupt | |
| 6,121,918 A | 9/2000 | Tullsson | |
| 6,191,726 B1 | 2/2001 | Tullsson | |
| 6,184,829 B1 | 9/2001 | Stilp | |
| 6,288,672 B1 | 9/2001 | Asano et al. | |
| 6,347,264 B2 | 2/2002 | Nicosia et al. | |
| 6,400,308 B1 | 6/2002 | Bell et al. | |
| 6,411,250 B1 | 6/2002 | Oswald et al. | |
| 6,417,796 B1* | 7/2002 | Bowlds | G01S 7/03 |
| | | | 342/104 |
| 6,583,753 B1 | 6/2003 | Reed | |
| 6,614,387 B1 | 9/2003 | Deadman | |
| 6,624,784 B1 | 9/2003 | Yamaguchi | |
| 6,674,908 B1 | 1/2004 | Aronov | |
| 6,714,956 B1 | 3/2004 | Liu et al. | |
| 6,747,595 B2 | 6/2004 | Hirabe | |
| 6,768,391 B1 | 7/2004 | Dent et al. | |
| 7,119,739 B1* | 10/2006 | Struckman | G01R 29/10 |
| | | | 342/174 |
| 7,289,058 B2 | 10/2007 | Shima | |
| 7,299,251 B2 | 11/2007 | Skidmore et al. | |
| 7,338,450 B2 | 3/2008 | Kristofferson et al. | |
| 7,460,055 B2 | 12/2008 | Nishijima et al. | |
| 7,545,310 B2 | 6/2009 | Matsuoka | |
| 7,545,321 B2 | 6/2009 | Kawasaki | |
| 7,564,400 B2 | 7/2009 | Fukuda | |
| 7,609,198 B2 | 10/2009 | Chang | |
| 7,642,952 B2 | 1/2010 | Fukuda | |
| 7,663,533 B2 | 2/2010 | Toennesen | |
| 7,728,762 B2 | 6/2010 | Sakamoto | |
| 7,791,528 B2 | 9/2010 | Klotzbuecher | |
| 7,847,731 B2 | 12/2010 | Wiesbeck | |
| 7,855,677 B2 | 12/2010 | Negoro et al. | |
| 7,859,450 B2 | 12/2010 | Shirakawa et al. | |
| 8,019,352 B2 | 9/2011 | Rappaport et al. | |
| 8,049,663 B2 | 11/2011 | Frank et al. | |
| 8,102,306 B2 | 1/2012 | Smith, Jr. et al. | |
| 8,154,436 B2 | 4/2012 | Szajnowski | |
| 8,330,650 B2 | 12/2012 | Goldman | |
| 8,390,507 B2 | 3/2013 | Wintermantel | |
| 8,532,159 B2 | 9/2013 | Kagawa et al. | |
| 8,547,988 B2 | 10/2013 | Hadani et al. | |
| 8,686,894 B2 | 4/2014 | Fukuda et al. | |
| 8,694,306 B1 | 4/2014 | Short et al. | |
| 9,121,943 B2 | 9/2015 | Stirling-Gallacher et al. | |
| 9,239,378 B2 | 1/2016 | Kishigami et al. | |
| 9,239,379 B2 | 1/2016 | Burgio et al. | |
| 9,282,945 B2 | 3/2016 | Smith et al. | |
| 9,335,402 B2 | 5/2016 | Maeno et al. | |
| 9,541,639 B2 | 1/2017 | Searcy et al. | |
| 9,568,600 B2 | 2/2017 | Alland | |
| 9,575,160 B1 | 2/2017 | Davis et al. | |
| 9,599,702 B1 | 3/2017 | Bordes et al. | |
| 2002/0004692 A1 | 1/2002 | Nicosia et al. | |
| 2002/0075178 A1 | 6/2002 | Woodington et al. | |
| 2002/0155811 A1 | 10/2002 | Prismantas | |
| 2003/0058166 A1 | 3/2003 | Hirabe | |
| 2003/0235244 A1 | 12/2003 | Pessoa et al. | |
| 2004/0012516 A1 | 1/2004 | Schiffmann | |
| 2004/0015529 A1 | 1/2004 | Tanrikulu et al. | |
| 2004/0066323 A1 | 4/2004 | Richter | |
| 2004/0138802 A1 | 7/2004 | Kuragaki et al. | |
| 2005/0069162 A1* | 3/2005 | Haykin | H04R 25/552 |
| | | | 381/312 |
| 2005/0201457 A1 | 9/2005 | Allred et al. | |
| 2005/0225476 A1 | 10/2005 | Hoetzel et al. | |
| 2006/0012511 A1 | 1/2006 | Dooi et al. | |
| 2006/0036353 A1 | 2/2006 | Wintermantel | |
| 2006/0109170 A1 | 5/2006 | Voigtlaender et al. | |
| 2006/0109931 A1 | 5/2006 | Asai | |
| 2006/0114324 A1 | 6/2006 | Farmer et al. | |
| 2006/0181448 A1 | 8/2006 | Natsume et al. | |
| 2006/0262007 A1 | 11/2006 | Bonthron | |
| 2007/0018884 A1* | 1/2007 | Adams | G01S 3/30 |
| | | | 342/147 |
| 2007/0018886 A1 | 1/2007 | Watanabe et al. | |
| 2007/0109175 A1 | 5/2007 | Fukuda | |
| 2007/0120731 A1 | 5/2007 | Kelly, Jr. et al. | |
| 2007/0132633 A1 | 6/2007 | Uchino | |
| 2007/0152870 A1 | 7/2007 | Woodington et al. | |
| 2007/0152871 A1 | 7/2007 | Puglia | |
| 2007/0152872 A1 | 7/2007 | Woodington | |
| 2007/0164896 A1 | 7/2007 | Suzuki et al. | |
| 2007/0182623 A1 | 8/2007 | Zeng | |
| 2007/0188373 A1 | 8/2007 | Shirakawa et al. | |
| 2007/0200747 A1 | 8/2007 | Okai | |
| 2008/0208472 A1 | 8/2008 | Morcom | |
| 2009/0015459 A1 | 1/2009 | Mahler et al. | |
| 2009/0015464 A1 | 1/2009 | Fukuda | |
| 2009/0073025 A1 | 3/2009 | Inoue et al. | |
| 2009/0079617 A1 | 3/2009 | Shirakawa et al. | |
| 2009/0121918 A1 | 5/2009 | Shirai et al. | |
| 2009/0212998 A1 | 8/2009 | Szajnowski | |
| 2009/0237293 A1 | 9/2009 | Sakuma | |
| 2009/0295623 A1 | 12/2009 | Falk | |
| 2010/0116365 A1 | 5/2010 | McCarty | |
| 2010/0156690 A1 | 6/2010 | Kim et al. | |
| 2010/0198513 A1 | 8/2010 | Zeng et al. | |
| 2010/0277359 A1 | 11/2010 | Ando | |
| 2011/0006944 A1 | 1/2011 | Goldman | |
| 2011/0187600 A1 | 8/2011 | Landt | |
| 2011/0196568 A1 | 8/2011 | Nickolaou | |
| 2011/0279303 A1 | 11/2011 | Smith, Jr. et al. | |
| 2011/0279307 A1 | 11/2011 | Song | |
| 2011/0285576 A1 | 11/2011 | Lynam | |
| 2011/0291874 A1 | 12/2011 | De Mersseman | |
| 2011/0292971 A1 | 12/2011 | Hadani et al. | |
| 2012/0001791 A1 | 1/2012 | Wintermantel | |
| 2012/0050093 A1 | 3/2012 | Heilmann et al. | |
| 2012/0112957 A1 | 5/2012 | Nguyen et al. | |
| 2012/0173246 A1 | 7/2012 | Choi et al. | |
| 2012/0257643 A1 | 10/2012 | Wu et al. | |
| 2013/0016761 A1 | 1/2013 | Nentwig | |
| 2013/0027240 A1 | 1/2013 | Chowdhury | |
| 2013/0069818 A1 | 3/2013 | Shirakawa et al. | |

(56) References Cited

U.S. PATENT DOCUMENTS

| | | |
|---|---|---|
| 2013/0102254 A1 | 4/2013 | Cyzs |
| 2013/0113653 A1 | 5/2013 | Kishigami et al. |
| 2013/0135140 A1 | 5/2013 | Kishigami |
| 2013/0169485 A1 | 7/2013 | Lynch |
| 2013/0176154 A1 | 7/2013 | Bonaccio et al. |
| 2013/0229301 A1* | 9/2013 | Kanamoto ............ G01S 3/74 342/158 |
| 2013/0244710 A1 | 9/2013 | Nguyen et al. |
| 2013/0314271 A1 | 11/2013 | Braswell et al. |
| 2014/0028491 A1 | 1/2014 | Ferguson |
| 2014/0035774 A1 | 2/2014 | Khlifi |
| 2014/0085128 A1 | 3/2014 | Kishigami et al. |
| 2014/0111372 A1 | 4/2014 | Wu |
| 2014/0159948 A1 | 6/2014 | Ishimori et al. |
| 2014/0220903 A1 | 8/2014 | Schulz et al. |
| 2014/0253345 A1 | 9/2014 | Breed |
| 2014/0348253 A1 | 11/2014 | Mobasher et al. |
| 2015/0035662 A1 | 2/2015 | Bowers et al. |
| 2015/0061922 A1 | 3/2015 | Kishigami |
| 2015/0198709 A1 | 7/2015 | Inoue |
| 2015/0204966 A1* | 7/2015 | Kishigami ............ G01S 13/325 342/189 |
| 2015/0226848 A1 | 8/2015 | Park |
| 2015/0234045 A1 | 8/2015 | Rosenblum |
| 2015/0247924 A1 | 9/2015 | Kishigami |
| 2015/0301172 A1 | 10/2015 | Ossowska |
| 2015/0323660 A1 | 11/2015 | Hampikian |
| 2016/0003939 A1 | 1/2016 | Stainvas et al. |
| 2016/0018511 A1 | 1/2016 | Nayyar et al. |
| 2016/0033631 A1 | 2/2016 | Searcy et al. |
| 2016/0041260 A1 | 2/2016 | Cao et al. |
| 2016/0061935 A1 | 3/2016 | McCloskey et al. |
| 2016/0084941 A1 | 3/2016 | Hassan |
| 2016/0084943 A1 | 3/2016 | Arage |
| 2016/0139254 A1 | 5/2016 | Wittenberg |
| 2016/0238694 A1 | 8/2016 | Kishigami |
| 2017/0023661 A1 | 1/2017 | Richert |

FOREIGN PATENT DOCUMENTS

| | | |
|---|---|---|
| FR | 2751086 | 1/1998 |
| WO | WO2015175078 | 11/2015 |
| WO | WO2015185058 | 12/2015 |
| WO | WO2016/011407 | 1/2016 |
| WO | WO2016030656 | 3/2016 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

* cited by examiner

SUCCESSIVE SIGNAL INTERFERENCE MITIGATION

CROSS REFERENCE TO RELATED APPLICATIONS

The present application claims the filing benefits of U.S. provisional applications, Ser. No. 62/327,005, filed Apr. 25, 2016, and Ser. No. 62/381,808 filed Aug. 31, 2016, which are both hereby incorporated by reference herein in their entireties.

FIELD OF THE INVENTION

The present invention is directed to radar systems, and in particular to radar systems for vehicles.

BACKGROUND OF THE INVENTION

The use of radar to determine range and velocity of objects in an environment is important in a number of applications including automotive radar and gesture detection. A radar typically transmits a radio frequency (RF) signal and listens for the reflection of the radio signal from objects in the environment. A radar system estimates the location and velocity of objects, also called targets, in the environment by comparing the received radio signal with the transmitted radio signal. Large signal sidelobes caused by large radar return radio signals may be created due to nearby targets that cause interferences, as well as due to self-interference sources.

SUMMARY OF THE INVENTION

The present invention provides methods and a system for achieving better performance in a radar system when there is a near object and a far object. The invention accomplishes better detectability of the far object in the presence of a near object by determining a portion of a received radio signal that is due only to one near object and removing that portion of the received radio signal from the total received radio signal and then processing the modified received radio signal to detect a more distant object. The process may be successively repeated for additional near objects that are interfering with the radar system's ability to detect a more distant object.

A radar sensing system for a vehicle in accordance with an embodiment of the present invention includes at least one transmitter, at least one receiver, a memory, and a processor. The at least one transmitter is operable to or configured for installation and use on a vehicle and transmits a radio frequency (RF) signal. The at least one transmitter is further operable to or configured to transmit an RF signal using phase modulation coding (i.e., PMCW) such as BPSK or GMSK. The transmitted RF signal is generated by up-converting a baseband signal. The at least one receiver is operable to or configured for installation and use on the vehicle and receives a reflected RF signal. The reflected RF signal is the transmitted RF signal reflected from an object or multiple objects. The reflected RF signal is down-converted, and then sampled and quantized using an analog-to-digital converter (ADC) to produce possibly complex baseband samples. The resulting samples from the ADC are processed by a successive interference attenuation module (SIAM) to remove those samples of radio signals that were reflected from near objects, as described below. Various forms of the successive interference attenuation module are described below.

A radar sensing system for a vehicle in accordance with another embodiment of the present invention includes a transmitter, a receiver, and an interference mitigation processor. The transmitter transmits radio signals. The receiver receives radio signals. The received radio signals include reflected radio signals that are each transmitted radio signals reflected from objects in the environment. The receiver also down-converts and digitizes the received radio signals to produce a baseband sampled stream. The interference mitigation processor produces a second sampled stream that includes samples from transmitted radio signals that are reflected from a first object. The interference mitigation processor uses the second sampled stream to remove selected samples from the baseband sampled stream that are attributed to radio signals reflected from the first object to produce a modified baseband sampled stream. The receiver uses the modified baseband sampled stream to detect a second object that is more distant than the first object.

These and other objects, advantages, purposes and features of the present invention will become apparent upon review of the following specification in conjunction with the drawings.

DESCRIPTION OF THE PREFERRED EMBODIMENTS

The present invention will now be described with reference to the accompanying figures, wherein numbered elements in the following written description correspond to like-numbered elements in the figures. Methods and systems of the present invention may achieve better performance from a radar system when there is a near object and a far object. Exemplary embodiments of the present invention accomplish better detectability of the far object in the presence of a near object by detecting the near object, estimating the parameters of the near object (amplitude, phase), regenerating the received radio signal reflected from just the near object, and then subtracting the regenerated signal reflected from the near object from the overall received signal. The process is successively repeated for additional objects.

The radar sensing system of the present invention may utilize aspects of the radar systems described in U.S. Pat. Nos. 9,575,160 and/or 9,599,702 and/or U.S. patent applications, Ser. No. 15/416,219, filed Jan. 26, 2017, and/or Ser. No. 15/428,447, filed Feb. 9, 2017, now U.S. Pat No. 9,720,073, and/or U.S. provisional applications, Ser. No. 62/382,857, filed Sep. 2, 2016, Ser. No. 62/327,004, filed Apr. 25, 2016, Ser. No. 62/327,006, filed Apr. 25, 2016, Ser. No. 62/327,015, filed Apr. 25, 2016, Ser. No. 62/327,016, filed Apr. 25, 2016, Ser. No. 62/327,018, filed Apr. 25, 2016, and/or Ser. No. 62/319,613, filed Apr. 7, 2016, which are all hereby incorporated by reference herein in their entireties.

Figure 1:
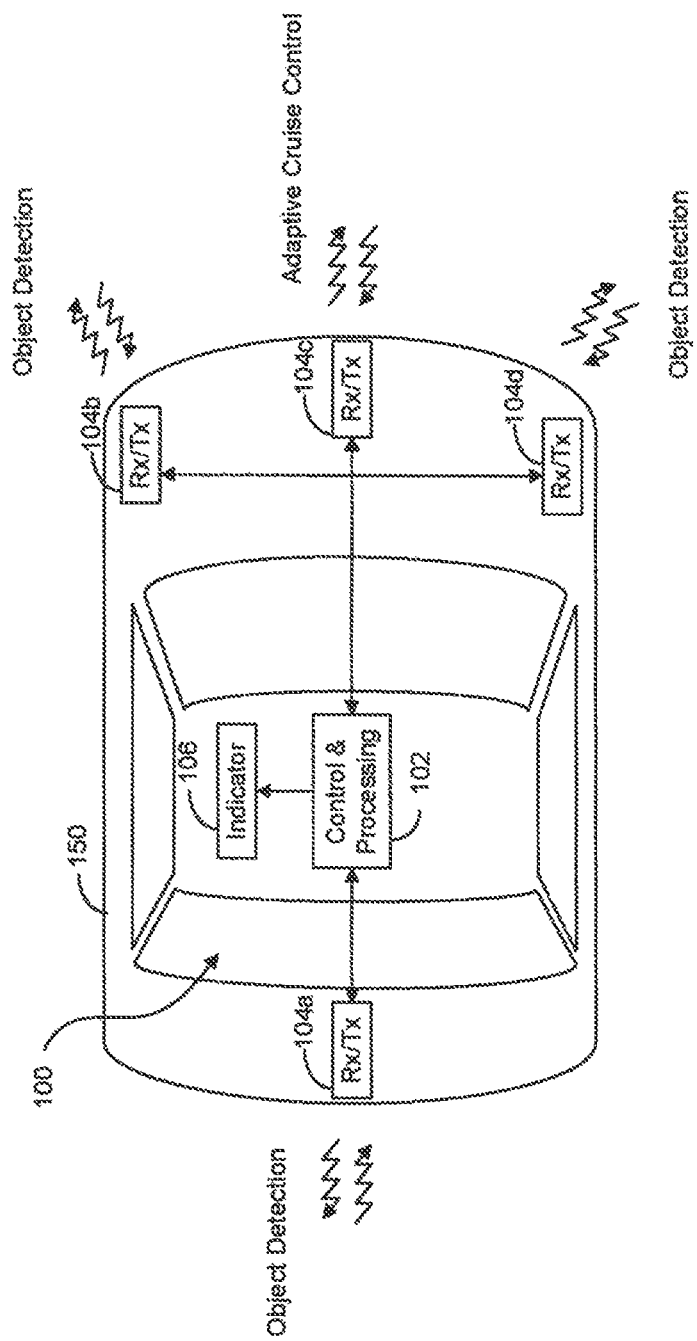
FIG. 1 is a plan view of an automobile equipped with a radar system in accordance with the present invention.

As illustrated in FIG. 1, there may be multiple radars (e.g., 104a-104d) embedded into an automobile. Each of these could employ the ideas contained in the present invention. FIG. 1 illustrates an exemplary radar system 100 configured for use in a vehicle 150. In an aspect of the present invention, a vehicle 150 may be an automobile, truck, or bus, etc. As illustrated in FIG. 1, the radar system 100 may comprise one or more transmitters and one or more virtual receivers 104a-104d, control and processing module 102 and indicator 106. Other configurations are also possible. FIG. 1 illustrates receivers/transmitters 104a-104d placed to acquire and provide data for object detection and adaptive cruise control. The radar system 100 (providing such object detection and adaptive cruise control or the like) may be part of an Advanced Driver Assistance System (ADAS) for the automobile 150.

There are several different types of signals that the transmitters in radar systems employ. One type is a frequency modulated continuous wave (FMCW) radar. In FMCW signals, the transmitted signal is a sinusoidal signal with varying frequency. By measuring the time difference between when a certain frequency was transmitted and when the received radio signal contained that frequency, the range to an object can be determined. A second type of transmitted radio signal used in radar systems is a phase modulated continuous wave (PMCW) signal. In this type of radar system, the transmitted radio signal is a sinusoidal signal in which the phase of the sinusoidal signal varies. Typically, the phase of the radio signal during a given time period (called a chip period or chip duration) is one of a finite number of possible phases. A spreading code consisting of a sequence of chips, (e.g., $+1, +1, -1, +1, -1, \ldots$) is mapped (e.g., $+1 \rightarrow 0$, $-1 \rightarrow \pi$) into a sequence of phases (e.g., $0, 0, \pi, 0, \pi, \ldots$) that is used to modulate the phase of the radio frequency (RF) signal. The spreading code could be a periodic sequence, or could be a pseudo-random sequence with a very large period, so it appears to be a nearly random sequence. Random number generators and pseudo-random number generators are explained in more detail in U.S. Pat. No. 9,575,160, which is hereby incorporated by reference herein in its entirety. The resulting radio signal has a bandwidth that is proportional to the rate at which the phases change, called the chip rate, which is the inverse of the chip duration. By comparing the return radio signal to the transmitted radio signal, the receiver can determine the range and the velocity of reflected objects.

Figure 2A:
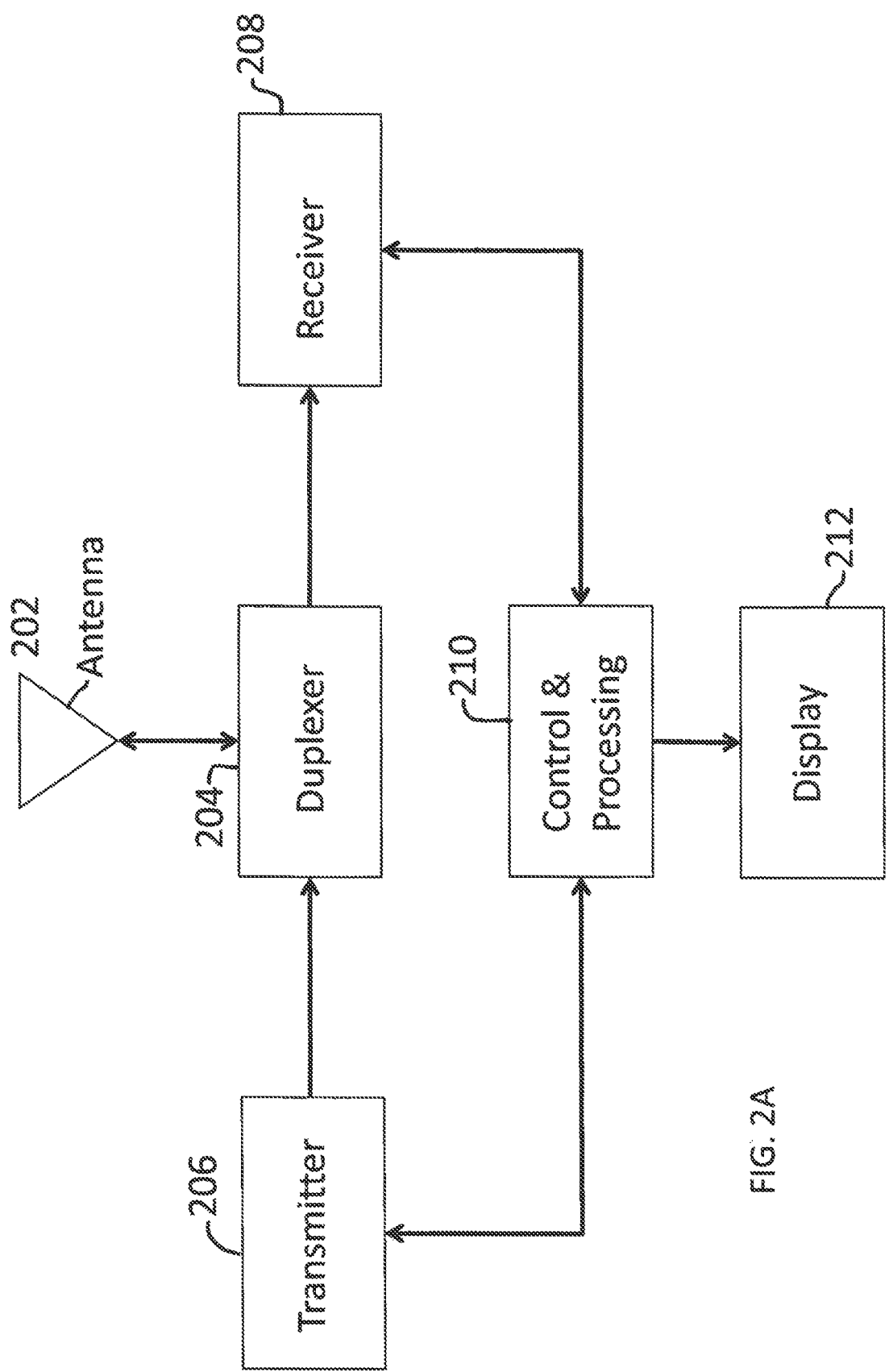
FIGS. 2A and 2B are block diagrams of radar systems in accordance with the present invention.
Figure 2B:
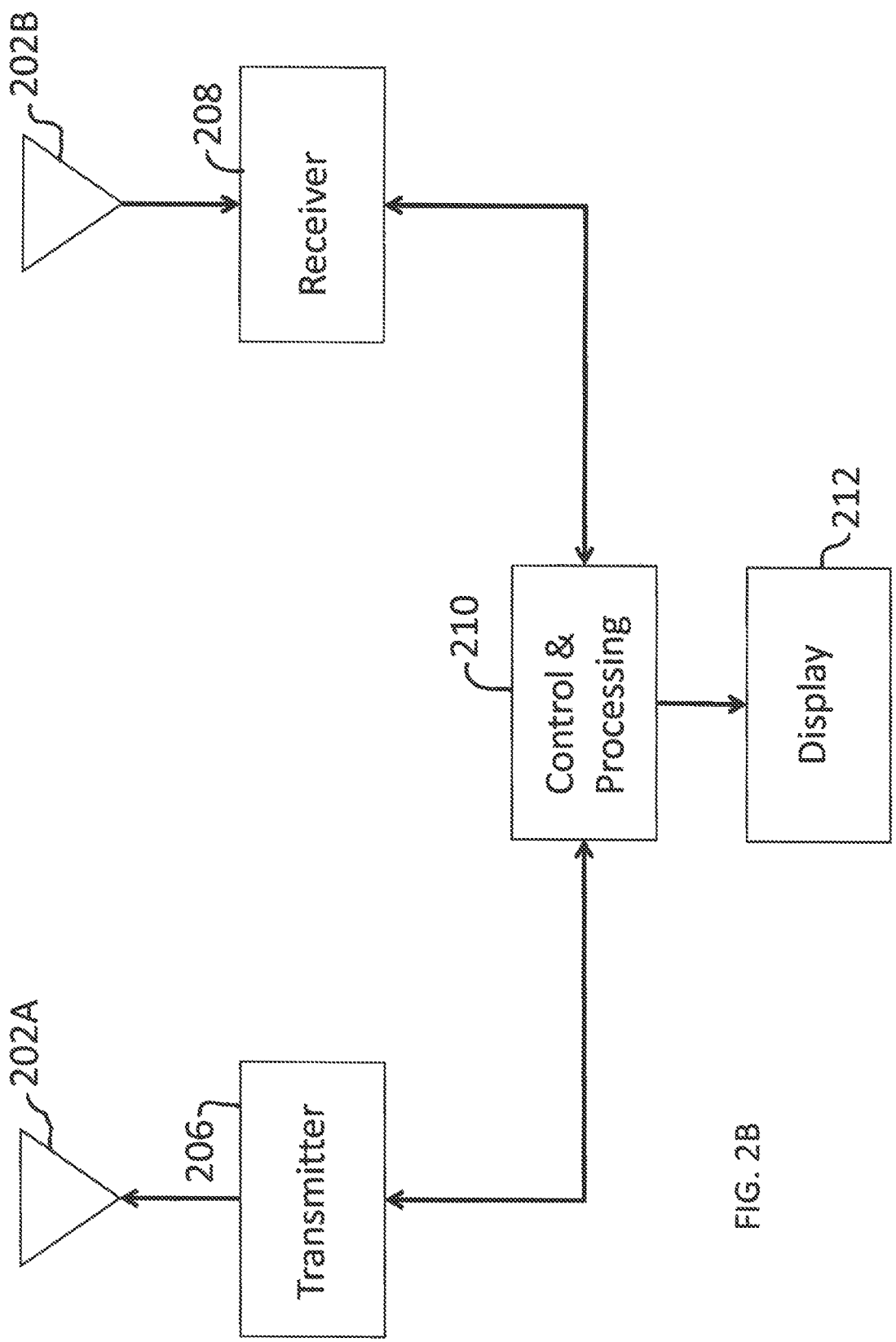

There are several ways to implement a radar system. One way, shown in FIG. 2A, uses a single antenna 202 for transmitting and receiving. The antenna is connected to a duplexer 204 that routes the appropriate radio signal from the antenna to the receiver 208 or routes the radio signal from the transmitter 206 to the antenna 202. A control processor 210 controls the operation of the transmitter and receiver and estimates the range and velocity of objects in the environment. A second way to implement a radar system is shown in FIG. 2B. In this system, there are separate antennas for transmitting 202A and receiving 202B. A control processor 210 performs the same basic functions as in FIG. 2A. In each case, there may be a display to visualize the location of objects in the environment.

Figure 3:
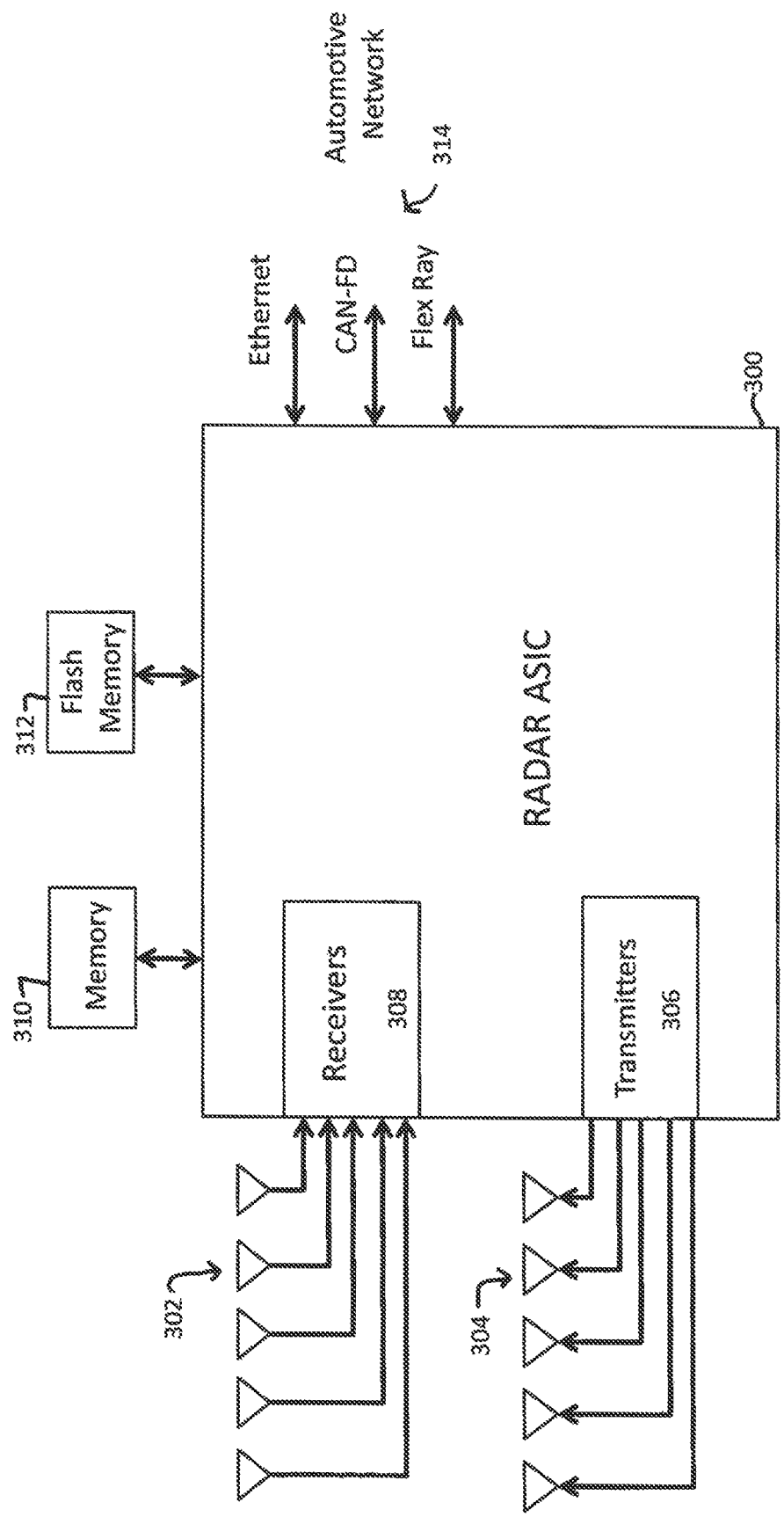
FIG. 3 is a block diagram of a radar system with a plurality of transmitters and a plurality of receivers in accordance with the present invention.

FIG. 3 illustrates a radar system with multiple antennas, multiple transmitters, and multiple receivers. Using multiple antennas allows a radar system to determine the angle of targets in the environment. Depending on the geometry of the antenna system, different angles (e.g., with respect to horizontal or vertical) can be determined. The radar system may be connected to a network via an Ethernet connection or other types of network connections 314. The radar system will have memory 310, 312 to store software used for processing the radio signals to determine range, velocity and location of objects. Memory can also be used to store information about targets in the environment.

Figure 4:
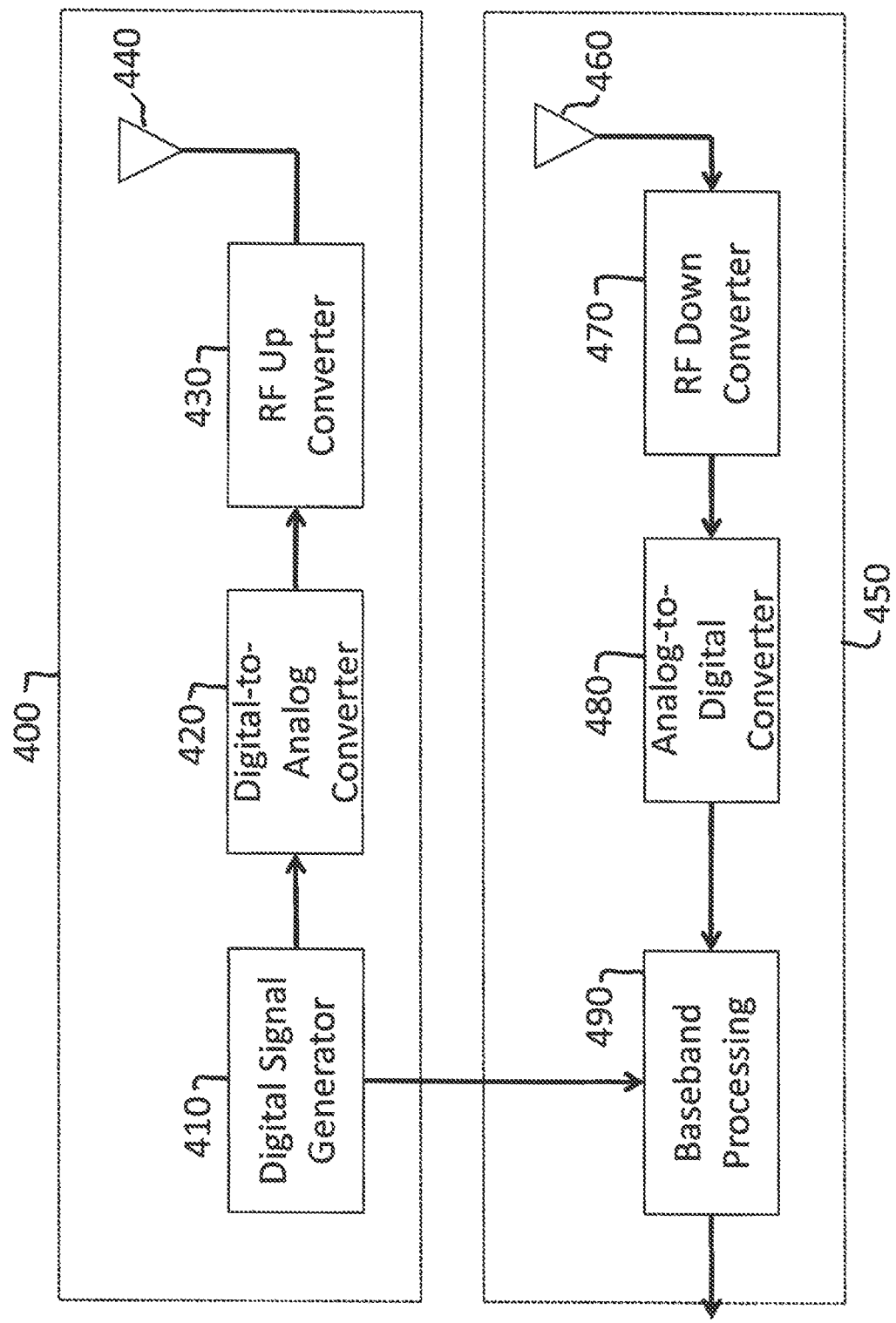
FIG. 4 is a block diagram of a single receiver and a single transmitter of a radar system in accordance with the present invention.

FIG. 4 is a basic block diagram of a PMCW system with a single transmitter and a single receiver. The transmitter 400, illustrated in FIG. 4, consists of a digital signal generator 410, a digital-to-analog converter (DAC) 420, and followed by an up converter 430 and an antenna 440. The digital signal generator generates a baseband signal. The baseband signal is converted from a digital representation to an analog representation by the DAC 420. The resulting signal is modulated onto a carrier frequency, and amplified and transmitted by the RF up converter 430. The receiver, also illustrated in FIG. 4, consists of a receiving antenna 460 and a down converter 470 that amplifies the received radio signal and mixes the received radio signal to the baseband signal. This is followed by an analog-to-digital converter (ADC) 480 and then baseband processing 490. There is also a control processor (not shown) that controls the operation of the transmitter and receiver.

Figure 5:
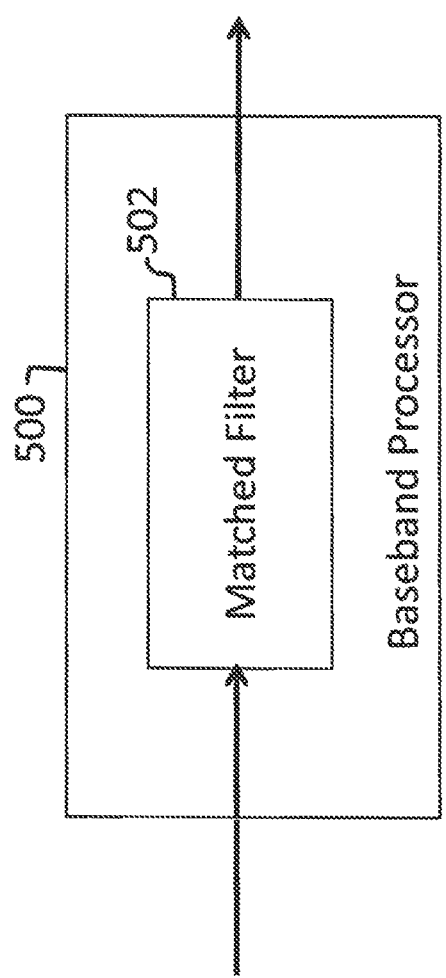
FIG. 5 is a block diagram illustrating a baseband processor utilizing a matched filter in accordance with the present invention.
Figure 6:
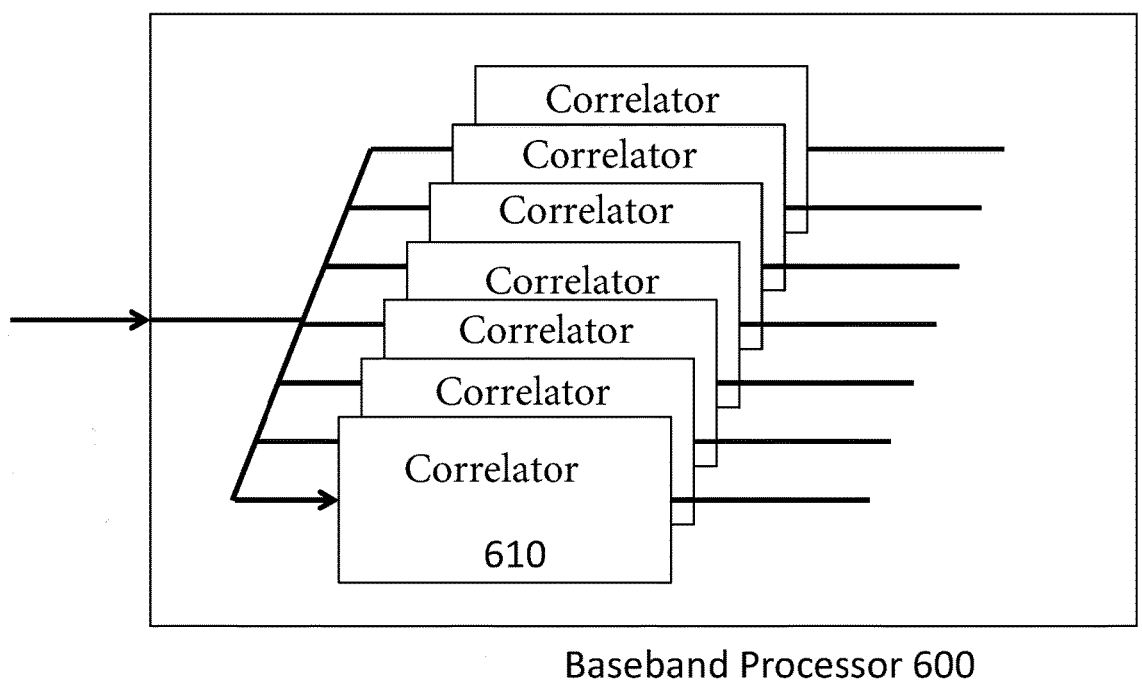
FIG. 6 is a block diagram illustrating a baseband processor utilizing correlators in accordance with the present invention.

After the received radio signal is down-converted and a received baseband signal is generated, a comparison is made to the baseband transmitted signal. There are various ways to make the comparison of signals. One method, illustrated in FIG. 5, uses a baseband processor 500 with a matched filter 502. The matched filter 502 generates a sequence of outputs. The output at a given time is the correlation of the baseband received signal with a delayed replica of the baseband transmitted signal. For a single target, the output would produce a large value for a time corresponding to the range of the target, and small signals for all other times. A second method of comparing the baseband received signal with the baseband transmitted signal is to use a bank of correlators 610, as illustrated in FIG. 6. Each correlator 610 produces the correlation of the received radio signal with various delays of the baseband transmitted signal. The output of the matched filter 502 as a function of time corresponds to the output of correlators corresponding to all possible ranges or delays. In some implementations only certain ranges are of interest. In this case, only correlators corresponding to the desired ranges need be implemented. One last method of comparing the baseband received signal with the transmitted radio signal is to implement the matched filter in the frequency domain. That is, a fast Fourier transform (FFT) of the baseband received signal is generated, as is a fast Fourier transform of the transmitted radio signal. The two frequency domain signals are multiplied and then an inverse FFT of the result is taken. This produces the same output as the matched filter, but may have a lower complexity to implement.

The output of the correlators, or the matched filter, or the FFT/IFFT are further processed in the baseband processing unit to obtain ranges, velocities, and angles of objects/targets in the environment, as would be known by one of skill in the art.

A radar that attempts to determine the range and velocity to multiple targets will receive a radio signal that contains radio signals reflected from each of the multiple targets. Because of signal amplitude loss incurred during the propagation of a signal—called the propagation loss—when a transmitted radio signal is reflected off of a near target it will be received at a much stronger signal level at the receiver than the same transmitted radio signal reflected off a farther away target. For example, a radio signal reflecting from a target at 10 meters will have a much larger signal strength than the same radio signal reflecting from a target at 100 meters. Because the spreading codes are not ideal (perfect autocorrelation function), there is some effect on the correlator output corresponding to the delay of a far target due to the radio signal reflected from the near target. The difference in signal level of the target returns will mean that the off-peak autocorrelation for the near target might be much larger than the on-peak autocorrelation for the far target.

Figure 7:
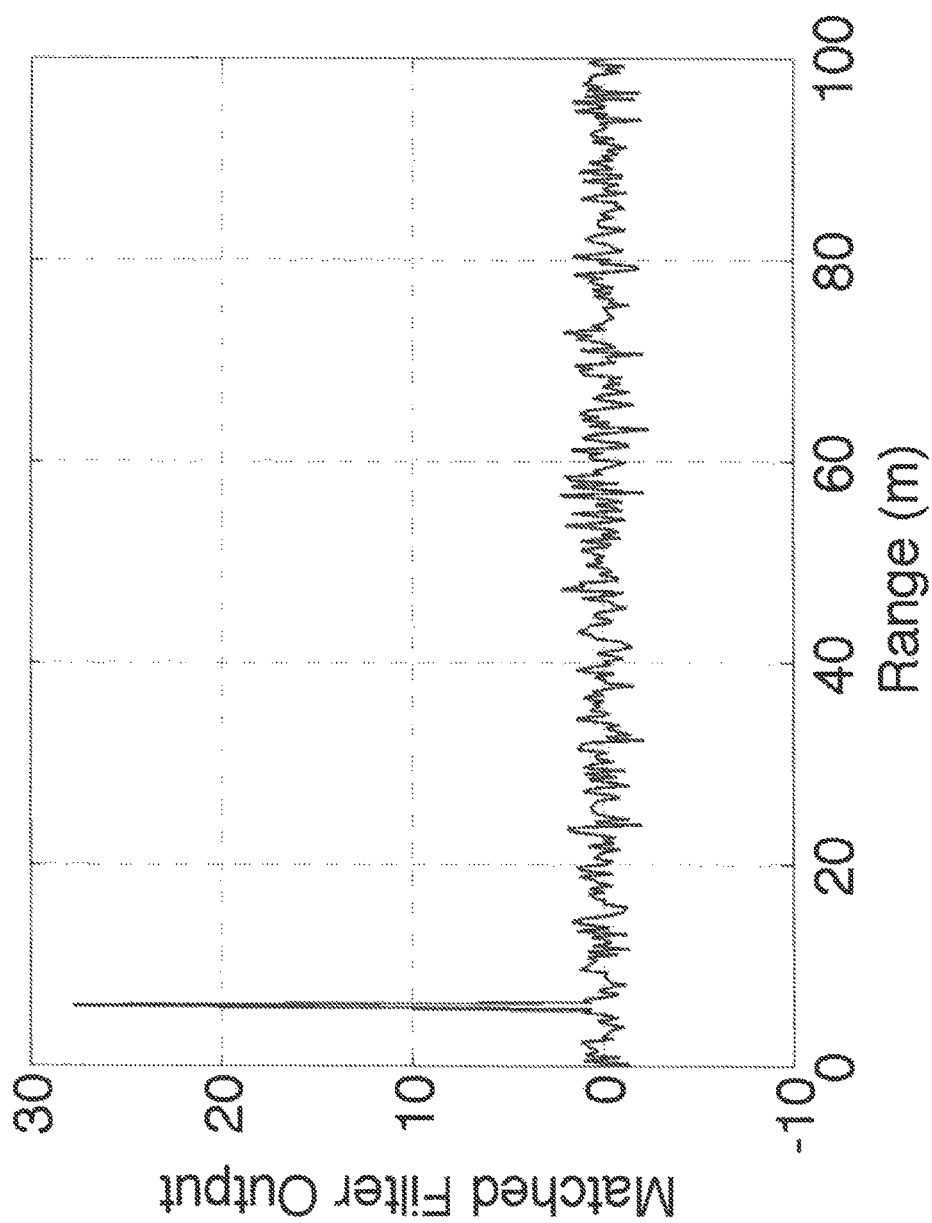
FIG. 7 is a graph illustrating an output of a matched filter corresponding to a single target at 6 meters in accordance with the present invention.

FIG. 7 illustrates an output of a matched filter that is matched to just the first 1000 chips of a much longer period spreading code when there is a single target at a distance of 6 meters. Here the chip rate is 500 Mchips per second and the chips are generated randomly (equally likely to be +1 and −1). The round-trip time to a target at a distance of 6 meters corresponds to 20 chips. The matched filter does many correlations over a window of 1000 chips. The output of the matched filter is equivalent to doing a correlation for each possible delay (range bin). For a target at a distance of 6 meters, the output of the matched filter will achieve a peak at a time of 1000+20=1020 chips after the transmission started. For purposes of illustration, a baseband signal is assumed with no phase change due to the reflection of the objects. FIG. 7 also illustrates the outputs scaled on the horizontal axis to the round-trip delay of targets. So, the large spike in the output occurs at a 6 meter range. Because the sequence used is not perfect, the output of the matched filter at other ranges is not zero. These off-peak outputs are called sidelobes.

Figure 8:
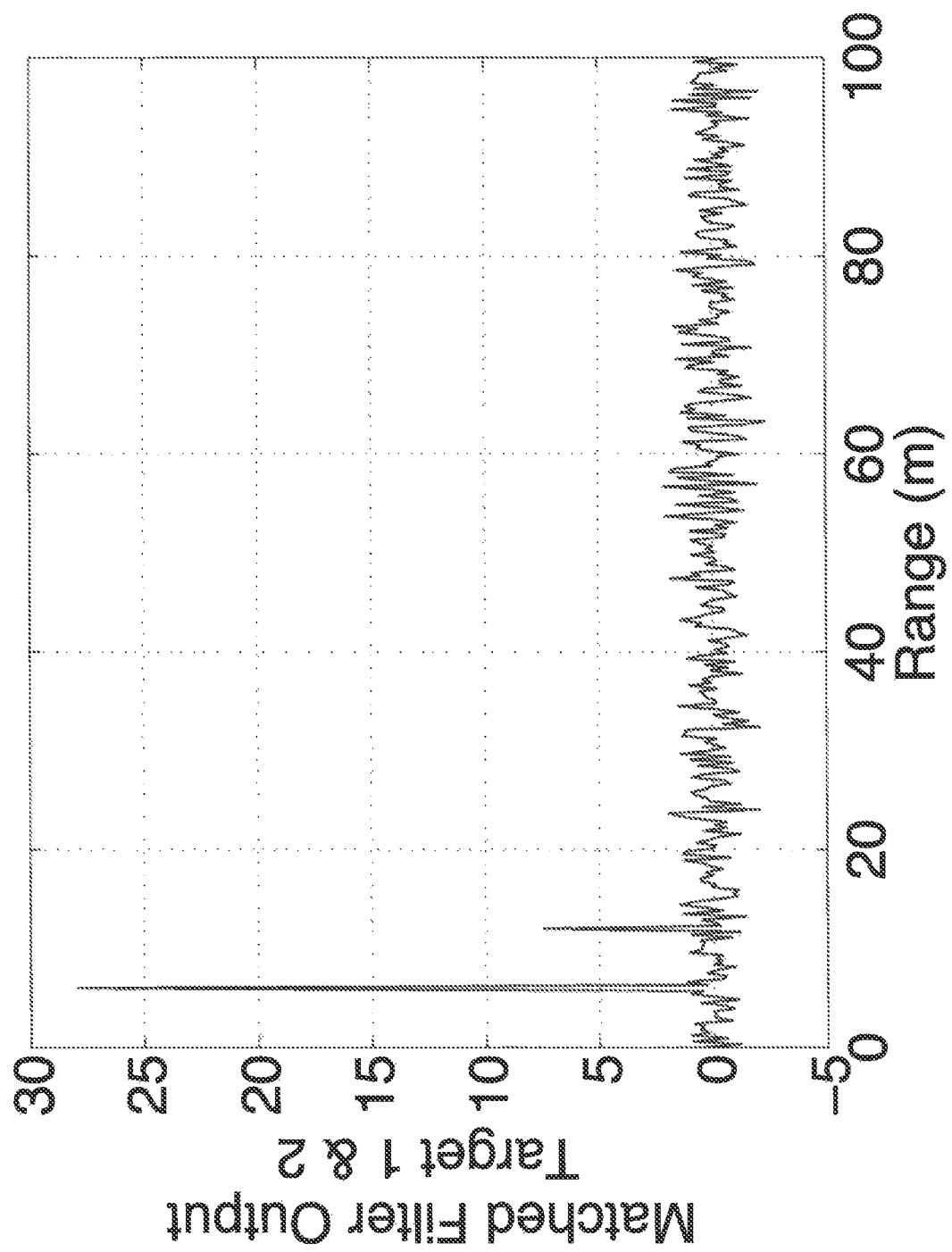
FIG. 8 is a graph illustrating an output of a matched filter corresponding to targets at 6 meters and 12 meters in accordance with the present invention.

If there are two targets, for example, one at 6 meters and another at 12 meters, the output of the matched filter would contain two clearly identifiable peaks corresponding to the reflected radio signals from the two targets. This is illustrated in FIG. 8. The second peak will be a factor of four smaller in amplitude than the peak due to the radio signal reflected from the target at 6 meters. This is because the propagation loss of power of the radio signal in each direction is inversely proportional to the square of the distance. So, there is an inverse square relation of signal power received at the target and then another inverse square relation of the radio signal received from the reflection of the target at the receiver. Thus, the received power is inversely proportional to the fourth power of the transmitted radio signal. The amplitude of the received radio signal is inversely proportional to the square of the transmitted radio signal. The output of the matched filter due to both targets is illustrated in FIG. 8. FIG. 7 also illustrates that the first target produces some output of the matched filter at a time corresponding to a target at 12 meters. This is called the sidelobe of the spreading code. This output is not zero because the spreading codes do not have an ideal autocorrelation function. The sidelobes of a target at one distance can affect the main peak of a target at a different distance. This becomes particularly problematic when the first target is much closer to the receiver than the far target. This is sometimes called the near-far problem.

Figure 9:
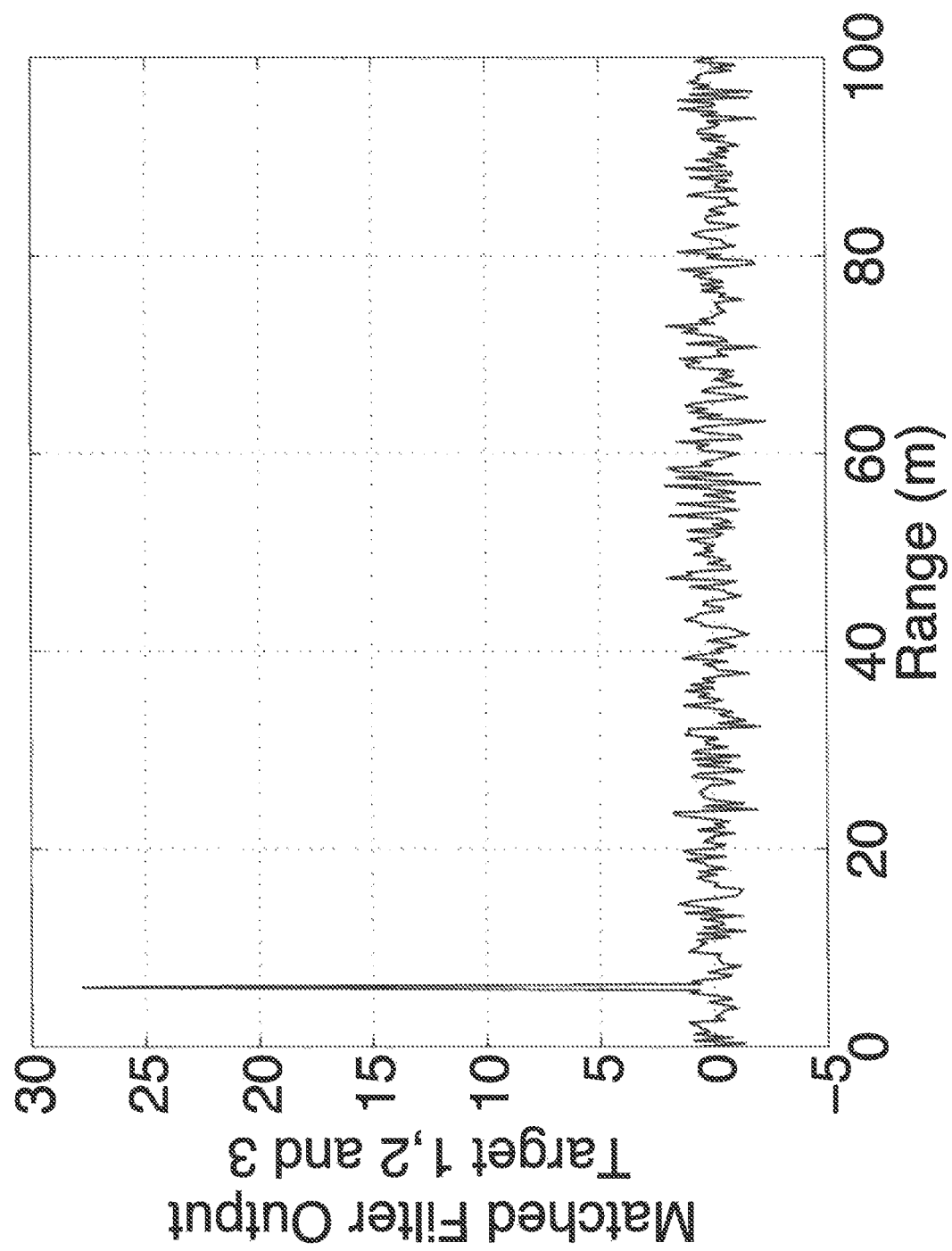
FIG. 9 is a graph illustrating an output of a matched filter corresponding to targets at 6 meters, 36 meters and 48 meters in accordance with the present invention.

To further illustrate the problem, an exemplary three targets are at distances of 6 meters, 36 meters, and 48 meters. FIG. 9 illustrates the output of the matched filter due to all three targets. It is evident that the peaks of the autocorrelation due to the second and third target essentially disappear in the sidelobes of the nearer target (that is, the target at 6 meters). This is because the amplitude of the reflected radio signal from the target at 36 meters is 36 times weaker than the amplitude of the reflected radio signal from the target at 6 meters or 1292 times weaker in power (about 31 dB). The amplitude of the radio signal reflected from a target at 48 meters is 64 times weaker than the amplitude of the radio signal reflected from a target at 6 meters (or 4096 times weaker in power) or 36 dB weaker. However, for a matched filter (or correlator) that is matched to a sequence of length 1000, the sidelobes are only roughly 30 times smaller than the peak. Therefore, the sidelobes of the radio signal associated with the target at 6 meters will often be larger than the peak of the matched filter output corresponding to a target at a distance of 36 meters. The situation will only be worse for the target at 48 meters.

So, a conventional radar system with a spreading factor of 1000 would not be able to accurately estimate the range and velocity of the far targets in the presence of a near target. To be able to detect and estimate the far targets in the presence of a near target, a much larger spreading factor could be used. However, increasing the spreading factor will increase the time required to determine the velocity of an object since multiple scans are needed to determine velocity.

The invention described herein overcomes this problem. The technique for overcoming the problem may be applied to a radar system employing a single transmitter and a single receiver or may be applied to a radar system with multiple transmitters and multiple receivers. The invention described herein may also be applied to radar systems using different types of PMCW including standard binary phase shift keying (BPSK), Gaussian Minimum Shift Keying (GMSK), as well as other modulation techniques.

Exemplary embodiments of the present invention provide methods and a system for achieving better performance in a radar system when there is a near object and a far target. Better detectability is accomplished for the far target in the presence of a near target by estimating the signal level (amplitude and phase) from the stronger near target, regenerating an attenuated version of the received radio signal reflected from the near target alone, then subtracting from the total radio signal an attenuated version of the radio signal reflected from the near target.

While the description herein is largely focused on a single transmitter-receiver pair, if there are $N_T$ transmitters and $N_R$ receivers, there will be $N_T \times N_R$ virtual radars, one for each transmitter-receiver pair. For example, a radar system with eight transmitters and eight receivers will have 64 pairs or 64 virtual radars (with 64 virtual receivers). When three transmitters (Tx1, Tx2, Tx3) are being received by three receivers (Rx1, Rx2, Rx3), each of the receivers is receiving the transmission from each of the transmitters. Each of the receivers is receiving the sum of all three of the transmissions at the same time. Each receiver can attempt to determine the range and Doppler of objects/targets by correlating with delayed replicas of the radio signal from one of the transmitters. The physical receivers may then be "divided" into three separate virtual receivers, each virtual receiver correlating with a replica of one of the transmitted radio signals. In a preferred radar system of the present invention, there are 1-4 transmitters and 4-8 receivers, or more preferably 4-8 transmitters and 8-16 receivers, and most preferably 16 or more transmitters and 16-64 or more receivers.

Successive Interference Attenuation:

Phase-modulated continuous-wave (PMCW) radars using pseudorandom binary sequence (PRBS) codes such as m-sequences, almost perfect autocorrelation sequences (APAS), Golay codes, as well as many other codes, all have range sidelobes that limit the dynamic range of the radar. Even codes that have ideal autocorrelation (e.g., Golay codes) can have range sidelobes in the presence of non-zero Doppler shift that will limit the detectability of far targets in the presence of near targets. These codes are used by PMCW radars to phase modulate a transmitted radio signal.

The correlators correlate (multiply and sum) a delayed replica of the transmitted radio signal with the received radio signal over a certain time interval. For PMCW radar systems that utilize PRBS codes and correlate over a certain time interval, the autocorrelation is not ideal. That is, the sidelobes are not zero. The sidelobes of a near target (when they are not zero) can mask the peak of the correlation for a far object or target because the radio signal and its resulting side lobes from the near object/target are far stronger than the radio signal from the more distant object/target.

Figure 10:
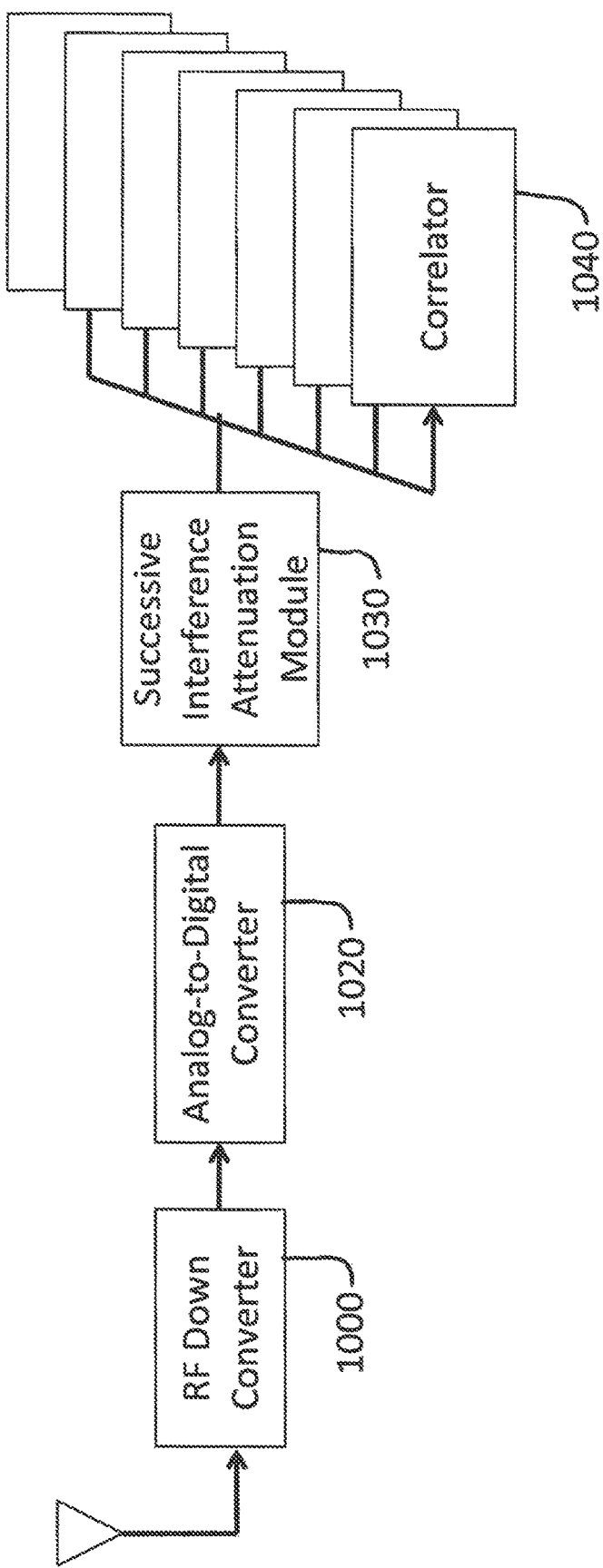
FIG. 10 is a block diagram illustrating the structure of a signal cancellation unit using a set of LMS filters for each transmitter in accordance with the present invention.
Figure 11:
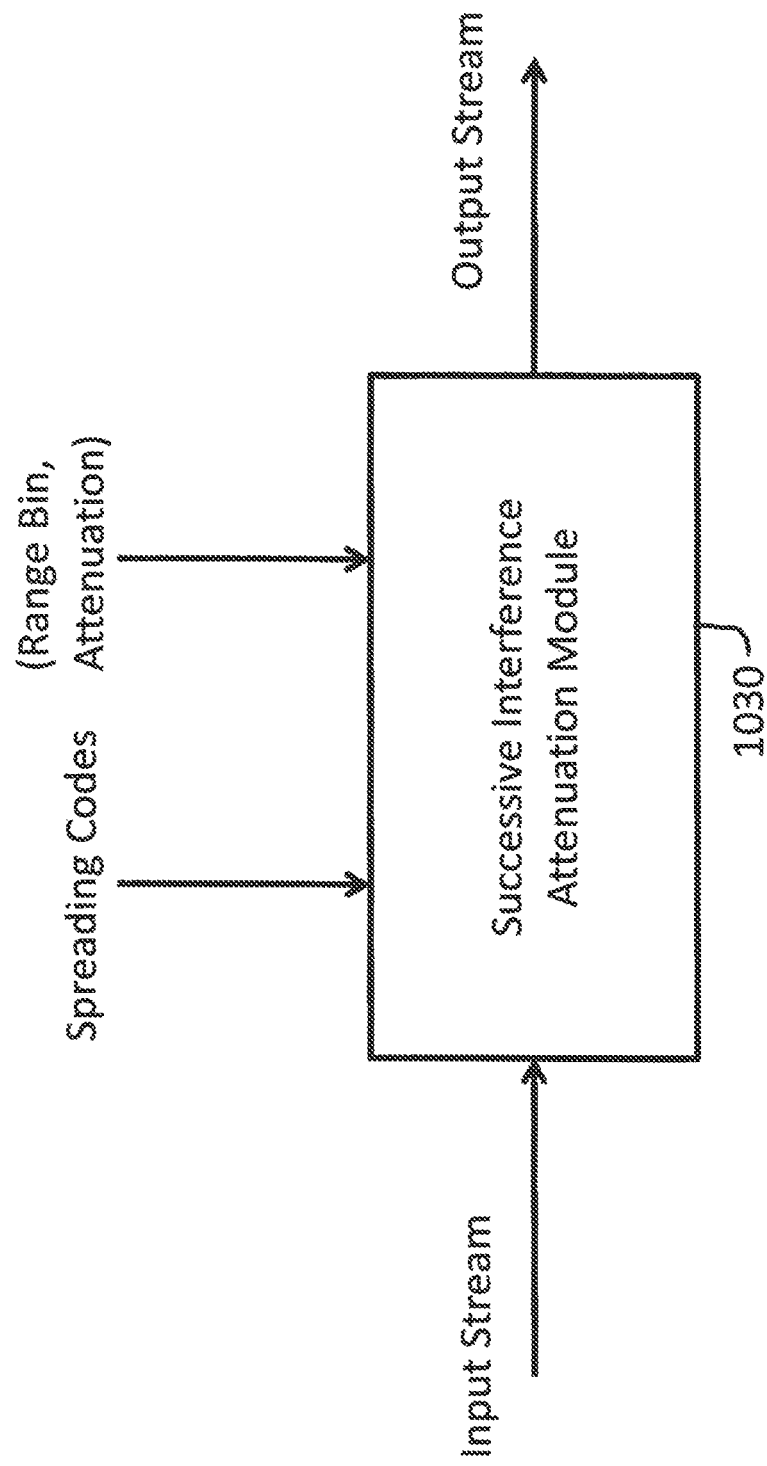
FIG. 11 is a block diagram illustrating the successive interference attenuation module (SIAM) along with the inputs and the output in accordance with the present invention.

In the present invention, to mitigate the effect of the sidelobes from near targets, the baseband sampled outputs are processed by an interference mitigation processor. FIG. 10 illustrates an exemplary receiver structure with a successive interference attenuation module (SIAM) 1030. The received radio signal is down-converted to a complex baseband signal via an RF front end 1000 and an analog-to-digital converter (ADC) 1020. Before performing the correlation (or matched filtering or FFT processing), the SIAM 1030 modifies the sample stream output from the ADC 1020. While FIG. 10 illustrates a bank of correlators 1040, optionally, these could be replaced with a matched filter or an FFT/IFFT processor. An input to the SIAM 1030 corresponding to the baseband samples is called an input stream and generally consists of two sequences or a single complex sequence of samples. Another input to the SIAM 1030 is a collection of range bins or delays for which the radio signals reflecting from objects/targets at those ranges (which are considered to be interference to the received radio signals reflected from objects/targets at more distant ranges) will be mitigated. The corresponding spreading codes from all the transmitters at those ranges is another input to the SIAM 1030. Theses inputs to the SIAM 1030 and an output stream are illustrated in FIG. 11. In one exemplary embodiment of the present invention, the SIAM 1030 performs its signal processing using a series of ordered actions, discussed below.

Figure 12:
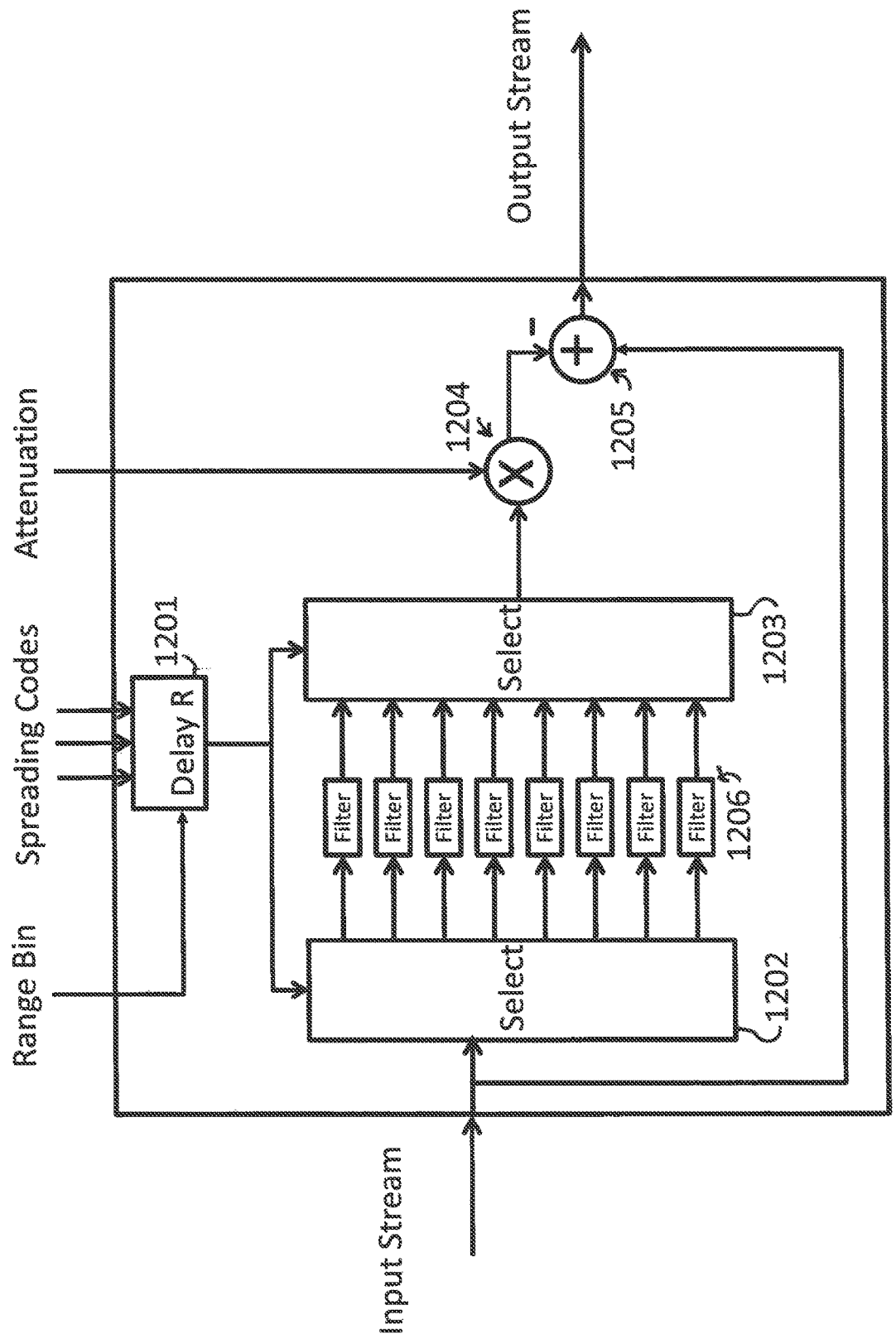
FIG. 12 is a block diagram illustrating the exemplary structure of one embodiment of the interference mitigation processing in accordance with the present invention.

A first action creates constellation points. Each sample from the input stream is associated with one point of a K-point constellation, where K is equal to the number of symbols (S) used by each transmitter (e.g., 2 symbols for BPSK) raised to the power of the number of transmitters (T) in the system. For example, a 3-transmitter BPSK radar would have an 8-point constellation: $K=(S^T)=(2^3)=8$. Each point corresponds to a particular value for the chips, one for each range. The point in the constellation with which sample n from the input stream is associated is determined as follows: the chip at the n-r position in each code stream is extracted; a T-bit integer is formed from said chips, which identifies a point in the constellation. For example, if there are T=3 transmitters, the 3 chips transmitted r chip times prior to when the current "I" and "Q" samples were received (time n) would form a 3-bit number from 0 to K−1=7 that identifies the point of the constellation with which the samples are associated at a particular range bin. Exemplary processing for this embodiment is illustrated in FIG. 12. Each sample of the input stream is routed (1202) to one of $S^T$ filters depending on the particular set of chips that are associated with the given range. That is, depending on the constellation point, the input stream is routed to one of $S^T$ possible filters.

The next action is calculating the mean of each point. For each point of the constellation, the average value of the "I" and "Q" samples associated with said point is computed (1206) in respective filters. In one embodiment, an exponentially weighted moving average is used, and is updated as samples are received. A moving average allows the constellation points to move over time, so as to track a signal with a non-zero Doppler shift. In another embodiment, when targets have zero or a near-zero Doppler shift, a simple average (mean) is used. The filtering operation produces an estimate of the interference associated with a given target at a certain range due to all the transmitters. There is a filter associated with each possible chip value for each possible transmitter. After filtering (or averaging), the filter 1206 that was selected by the selection mechanism 1202 is also used to select, via selection mechanism 1203, which filter output will be used to generate the output stream. After this selection, the resulting signal is attenuated (1204) and then subtracted from the input (1205) to produce the output stream. The number of filters in this approach is $S^T$, which for many transmitters can be large.

The number of constellation points needed and the number of filters used can be reduced for binary codes by realizing that for each constellation point there is another constellation point that is the opposite. In this case, the input stream may be modified before filtering with a simple sign change and after filtering in a likewise manner. Instead of needing $2^T$ filters, only $2^{(T-1)}$ filters are needed. For the case of 3 transmitters, this reduces the number of filters to 4. For the case of one transmitter and binary codes, this reduces the number of filters needed to one.

Multiple target interference mitigation processing may be performed for multiple range bins corresponding to multiple objects/targets. Thus, the term successive interference mitigation.

The output stream of the SIAM 1030 is used as the input to correlators that correlate the received radio signal with delayed replicas of the transmitted radio signals. As discussed herein, the output stream from the SIAM 1030 could also be used by a matched filter or through FFT/IFFT processing. The result of the interference mitigation performed by the SIAM 1030 is that the radio signals reflected from near targets are reduced in amplitude. Such amplitude reduction is also seen in the corresponding sidelobes, such that radio signals reflecting from more distant objects/targets can be detected and their ranges and velocities estimated.

In the case of a single transmitter and a single receiver and binary codes, the creation of constellation points for a given near target can be done by just multiplying the input stream with the chips of the spreading code corresponding to the delay of the given target and filtering. In this case, a single filter is needed. The regeneration of corresponding baseband samples of the near radio signal is done by just multiplying with the code.

In one embodiment, the output of the SIAM 1030 is only used for more distant objects/targets. Determining the range, velocity and angle of nearby objects/targets does not need interference mitigation. As such, the SIAM processing can be bypassed for nearby objects/targets.

Several modifications to the basic algorithm for interference mitigation are also part of the present invention to reduce the complexity. As described above, the number of filters required grows exponentially with the number of transmitters in the radar system. An alternative approach is to individually estimate the interference due to a radio signal from a single transmitter reflecting from a single target. In this case, two filters can be used (for binary modulation) for each transmitter. Thus, the number of filters is 2*T rather than $2^T$. In addition, an adaptive least mean square (LMS) filter can be employed. Using an LMS filter allows the constellation for each transmitter to be estimated independently, and constellation points from each transmitter to be summed in accordance with the transmitted codes, in order to calculate the estimate of the received radio signal. This allows a significant reduction in the number of constellation points that must be estimated, especially when there are many transmitters and many chips of intersymbol interference (ISI) history.

Figure 13:
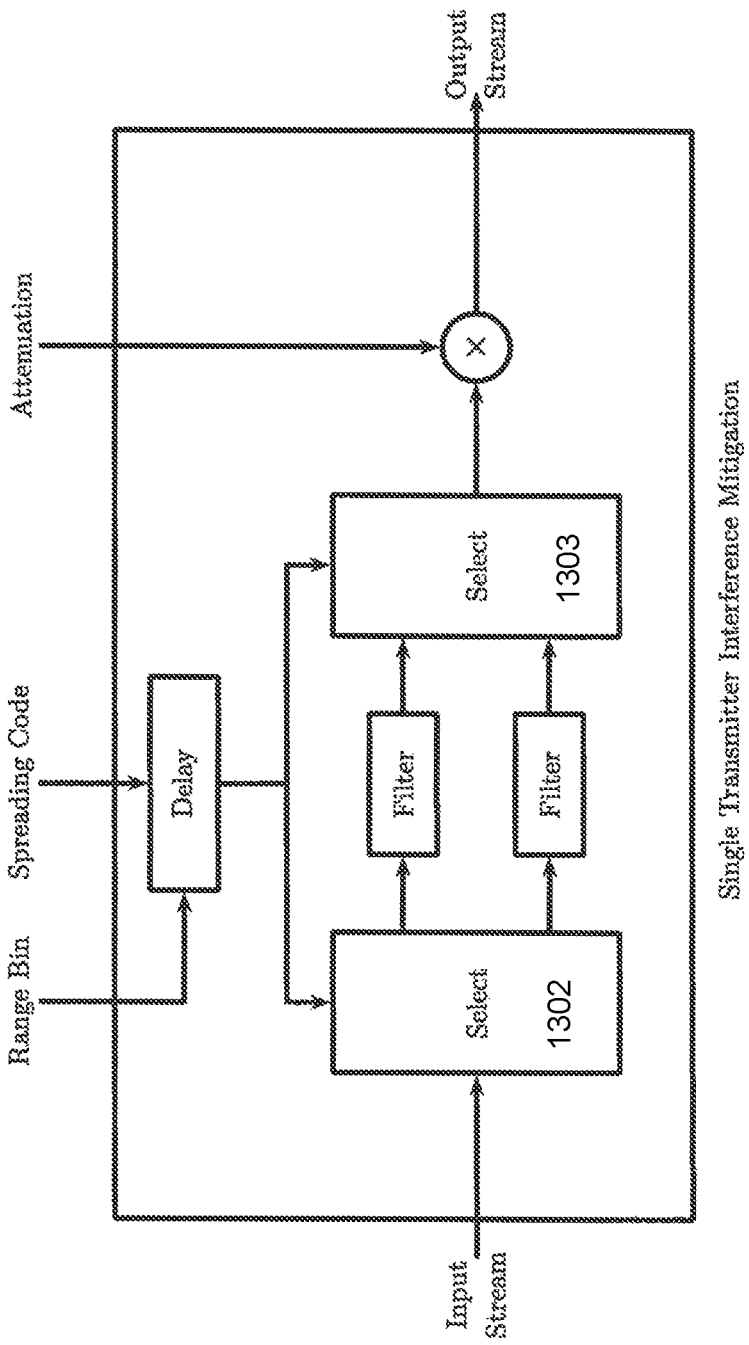
FIG. 13 is a block diagram illustrating the exemplary structure of another embodiment of the interference mitigation processing for a single antenna in accordance with the present invention.
Figure 14:
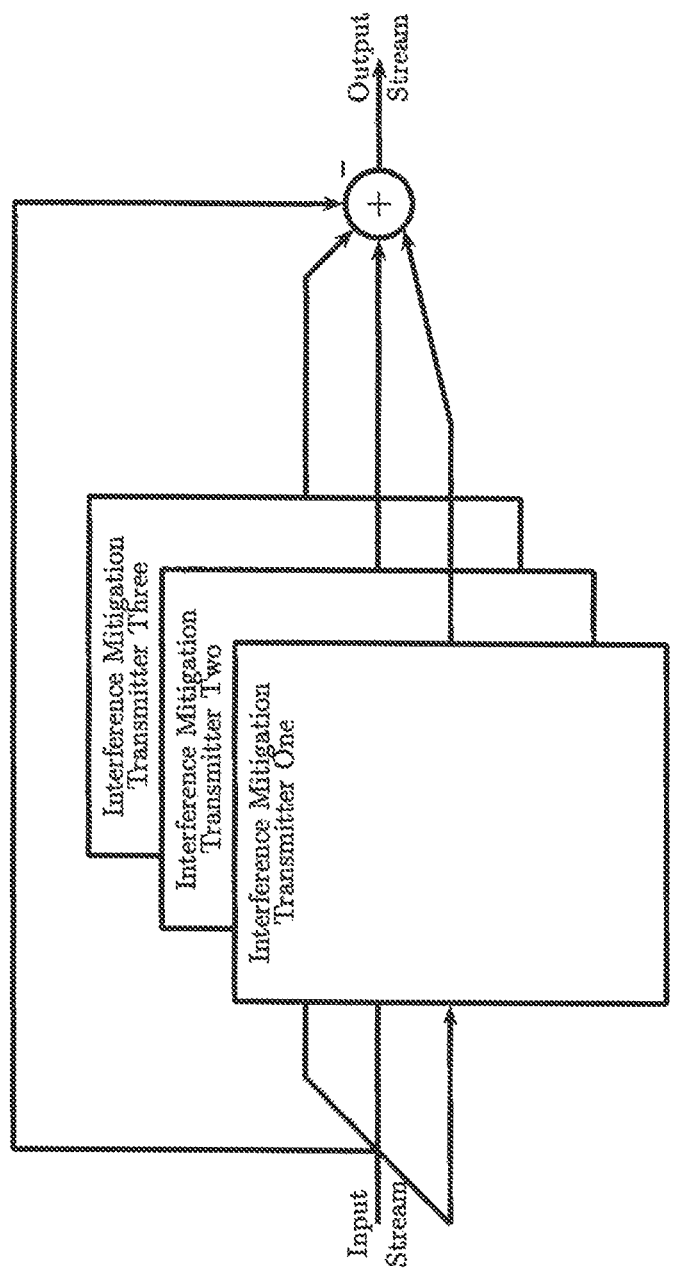
FIG. 14 is a block diagram illustrating an exemplary combination of multiple single transmitter interference mitigation blocks in accordance with the present invention.

FIG. 13 illustrates this alternative approach for estimating the interference due to a radio signal from a single transmitter that is reflecting from a single target. The basic approach, as illustrated in FIG. 12, is the same, except that it is for a single transmitter. As illustrated in FIG. 13, a pair of selectors (1302, 1303) are used as well as only a pair of filters. FIG. 14 illustrates an optional arrangement where multiple single-transmitter interference mitigation modules of FIG. 13 are used in parallel to mitigate the interference from all of the transmitters at a single range bin. It is noted that various combinations of parallel processing of different transmitters and sequential processing are possible.

Figure 15:
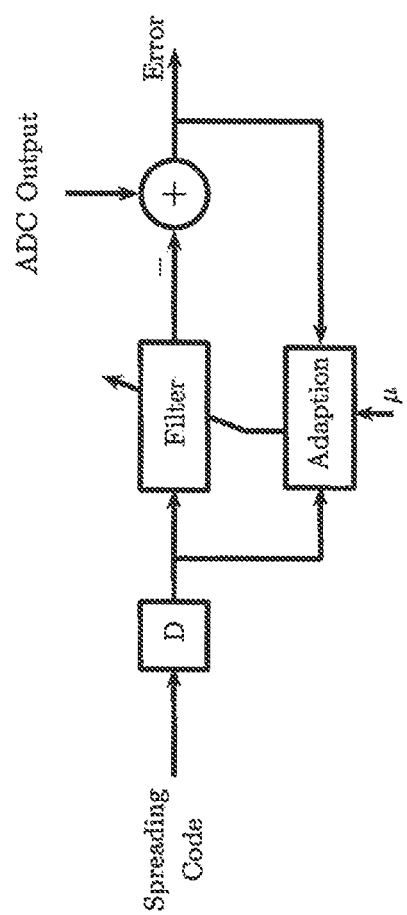
FIG. 15 is a block diagram illustrating an embodiment for tracking a radio signal from a given target in accordance with the present invention.

Another optional approach to interference mitigation is based on the least mean square estimation technique. For example, the radio signal from a given transmitter, reflecting from a given target, is estimated and then subtracted from the overall received radio signal. If perfect estimation was possible, nearby objects/targets would not blind the receiver to more distant objects/targets. FIG. 15 illustrates the general approach. The spreading code, appropriately delayed, is used as the input to an adaptive filter. The difference between the filter output and the actual samples from the analog-to-digital converter is used as an error signal and is also used to update the filter coefficients. As illustrated in FIG. 15, the filter update also uses the spreading code and a parameter μ that determines a weighting of the past samples versus current samples.

Figure 16:
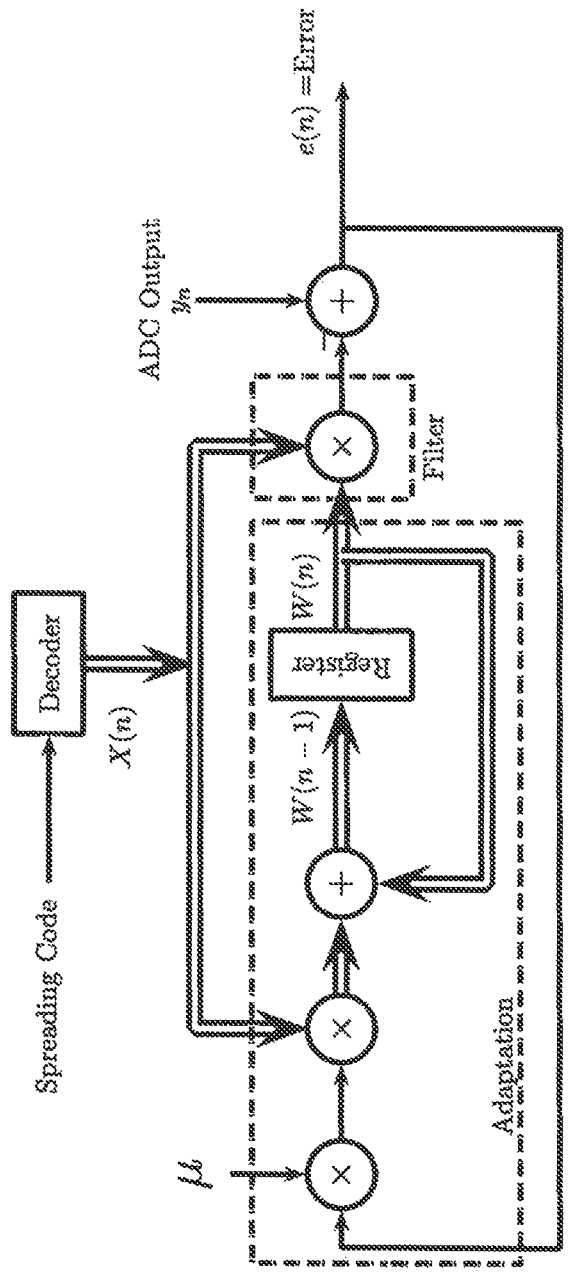
FIG. 16 is a block diagram illustrating processing for estimating a single target in the absence of inter-chip interference in accordance with the present invention.

A particular realization of this approach is illustrated in FIG. 16. The spreading code is the input to a decoder that produces one of two vectors. At time n, the two possible column vectors from the decoder are $X(n)=[1, 0]^T$ or $X(n)=[0, 1]^T$ where T stands for transpose and the capital letters denote vectors. Double lines in the figure (FIG. 16) represent vectors. The current weights $W(n)=[w_0(n), w_1(n)]^T$ are updated as follows. The filter calculates the vector dot product of W(n) with X(n), namely $W(n)^{T*} X(n)$ where $W(n)^{T*}$ means the complex conjugate and transpose of W(n). An error signal ($e(n)=y(n)-W(n)^T$) is generated that is the difference between the filter output and the ADC sample value. The error signal is weighted by μ and then the product with the code is calculated to determine how to update the filter W(n). The update equation is $W(n)=W(n-1)+\mu e(n) X(n)$. The filter, at any given time, is only updating one of two complex values. These values are the estimated response of the channel due to a particular spreading code chip. There should be two possible responses because there are only two possible chips for binary spreading codes.

Figure 17:
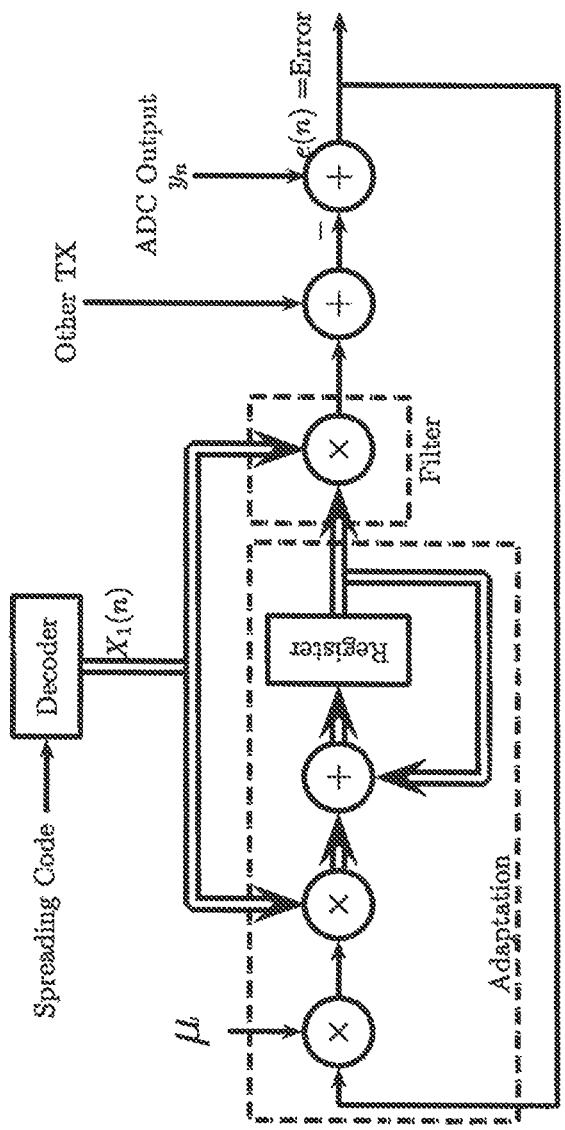
FIG. 17 is a block diagram illustrating a process for reducing the interference due to multiple transmitters or multiple targets in accordance with the present invention.

The same approach may also be applied to multiple transmitters by repeating the adaptation and filter structure in FIG. 16 for each transmitter. The error signal then is the error between the received sample and the sum of all the other estimates of the signals. This is illustrated in FIG. 17. Here, the signal processing to regenerate the received radio signal from a particular transmitter at a particular range is shown as in FIG. 16. However, other regenerated radio signals corresponding to other transmitters are combined before generating the error signal. The processing for the other transmitters is identical to that shown in FIG. 16, except different codes can be used. A single error signal may be used for all the signal processing for different transmitters.

Figure 18:
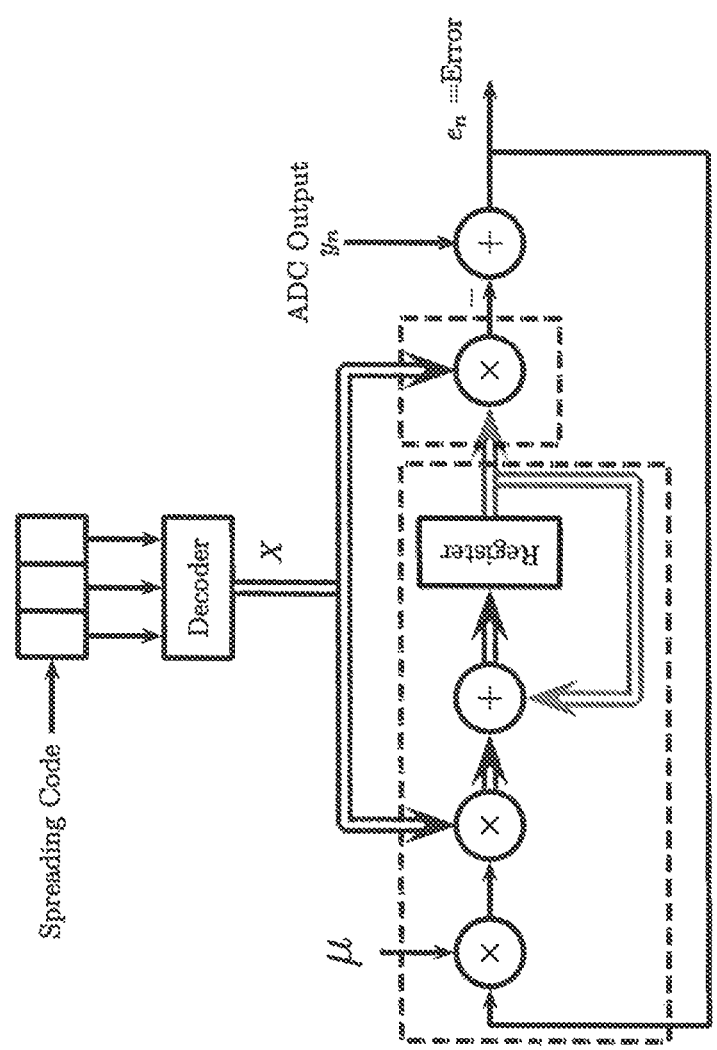
FIG. 18 is a block diagram illustrating a process to reduce interference taking into account inter-chip interference in accordance with the present invention.

Often because of filtering of signals at the transmitter or receiver, or because a particular target can affect multiple range bins, there can be inter-chip interference. Consider a single transmitter that has inter-chip interference. The goal is to regenerate the signal taking into account the inter-chip interference. In this case, multiple consecutive chips are needed to determine the appropriate filter. A block diagram of the approach in this case with a single transmitter is shown in FIG. 18. Here, the spreading code (delayed appropriately) is the input to a shift register. The contents of the shift register determine a vector. In FIG. 18, three elements of the spreading code determine a (column) vector of size 8. The register with the filter coefficients is also a register of size 8. The same approach to updating the filter coefficients is used in this case as is used in the case of no inter-chip interference. The size of the register here will grow exponentially with the amount of inter-chip interference. For outputs that depend on three chips, the size of the register is 8, assuming binary valued chips. With inter-chip interference, the processing is estimating the response at a particular time due to a number of consecutive chips. The result, for binary modulation/spreading codes, is a set of 8 possible complex constellation points.

Modulation techniques, like MSK and GMSK, are inherently based on IQ modulation in which the spreading codes map into four possible constellation points. However, at any time there are only two possible transitions from a given constellation point to the next constellation point. As such, an additional input variable (namely whether the input is an even chip or an odd chip) will double the number of constellation points. As such, this will double the size of the register (filter taps).

Figure 19:
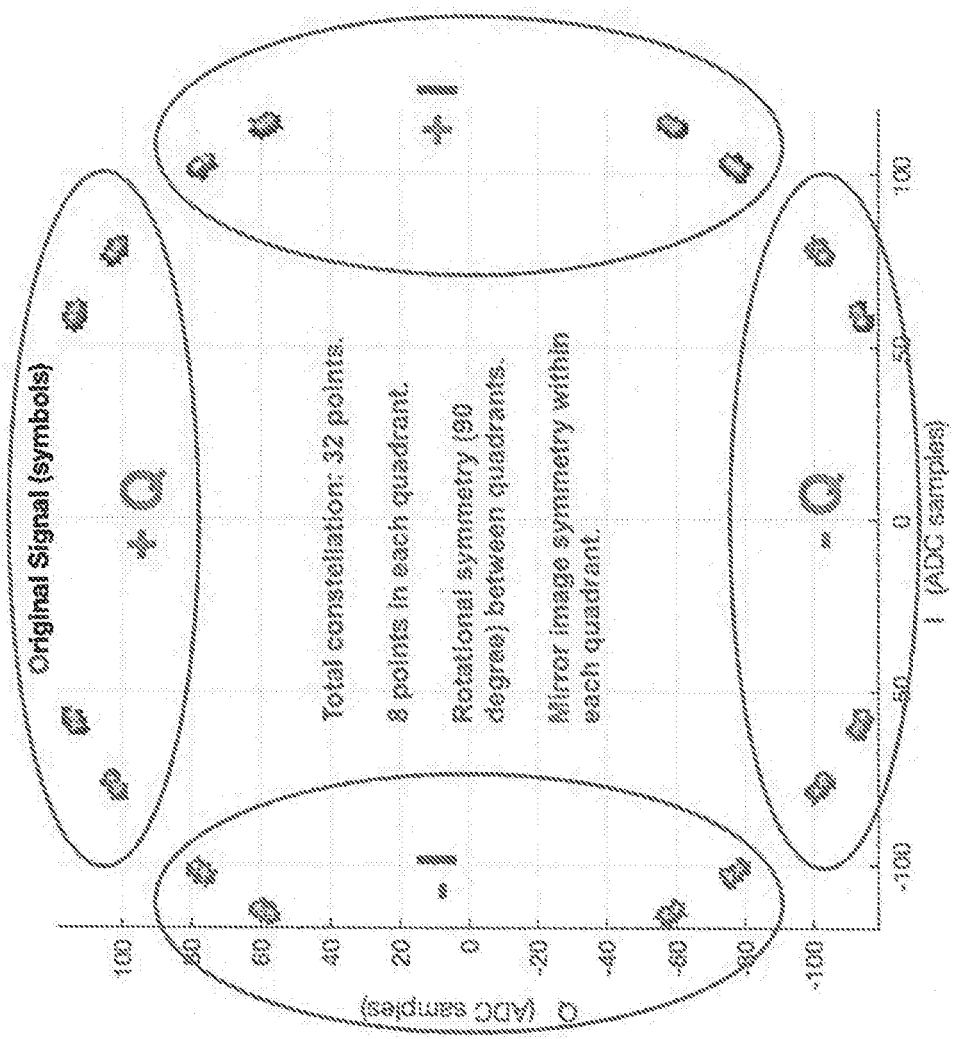
FIG. 19 illustrates an exemplary constellation for interference from a single target in accordance with the present invention.

By applying the appropriate processing (e.g., rotation and mirror image) the size of the constellation that is tracked can be reduced. As an example, FIG. 19 illustrates a constellation for GMSK and inter-chip interference, where the output depends on four consecutive chips. There are 32 points illustrated in FIG. 19. These 32 points may be obtained as follows. At any time there are four possible constellation points. However, given a certain constellation point, each consecutive symbol has only two possibilities. Thus, with a current chip and one previous chip, there are eight possible constellation points. With a current chip and two previous chips, there are 16 possible constellation points. With a current chip and three previous chips, there are 32 possible constellation points. FIG. 19 illustrates the symmetry of the response due to different sequences of chips. While there appear to be only 16 distinct constellation points, each cluster is really two different constellation points that are too close to distinguish visibly.

Figure 20:
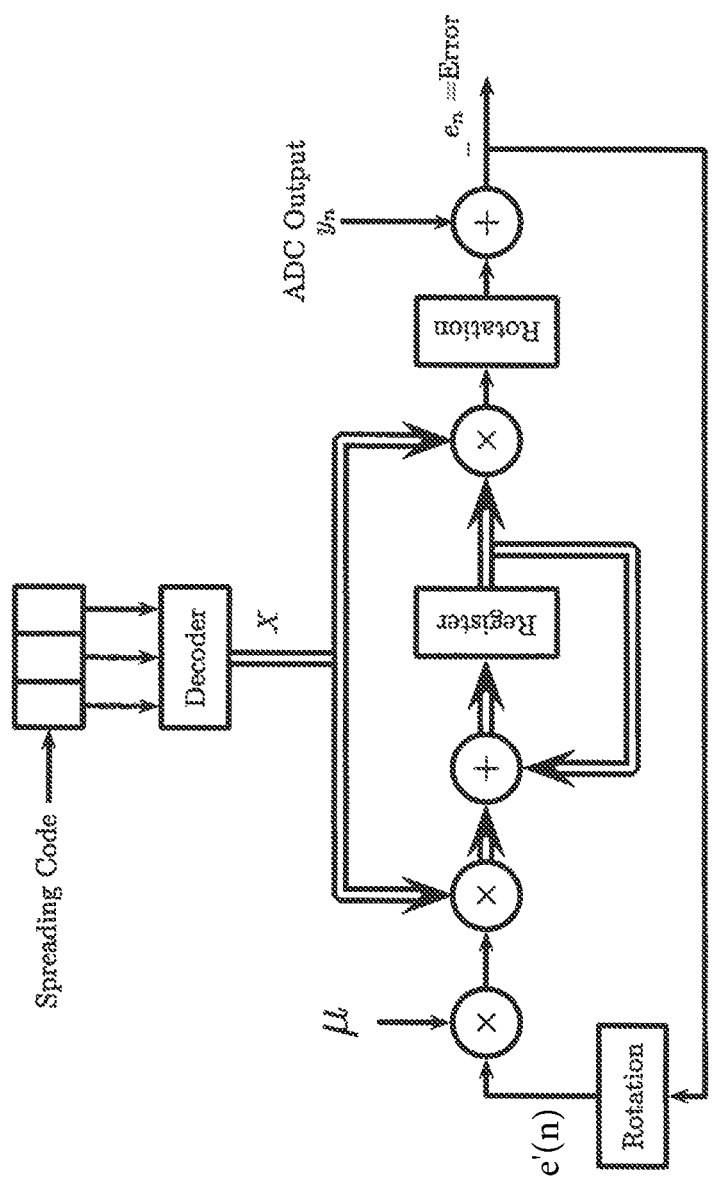
FIG. 20 illustrates an exemplary process for exploiting symmetry in tracking the interference in accordance with the present invention.

This inherent symmetry may be exploited by rotating a set of 8 signals by 90 degrees and another set by 90 degrees, as illustrated in FIG. 20, depending on the code. Secondly, the points are then rotated by 180 degrees to reduce the number of constellation points by another factor of 2. FIG. 20 is a block diagram illustrating the exemplary processing. There are two rotation processing elements in FIG. 20. Both of these rotation processing elements also have as inputs (even though it is not shown) the spreading code representation X(n) so that the rotation is based on a set of chips. The second rotation is the inverse of the first rotation. The output of the rotation which has the error signal e(n) as the input is denoted by e'(n).

Figure 21:
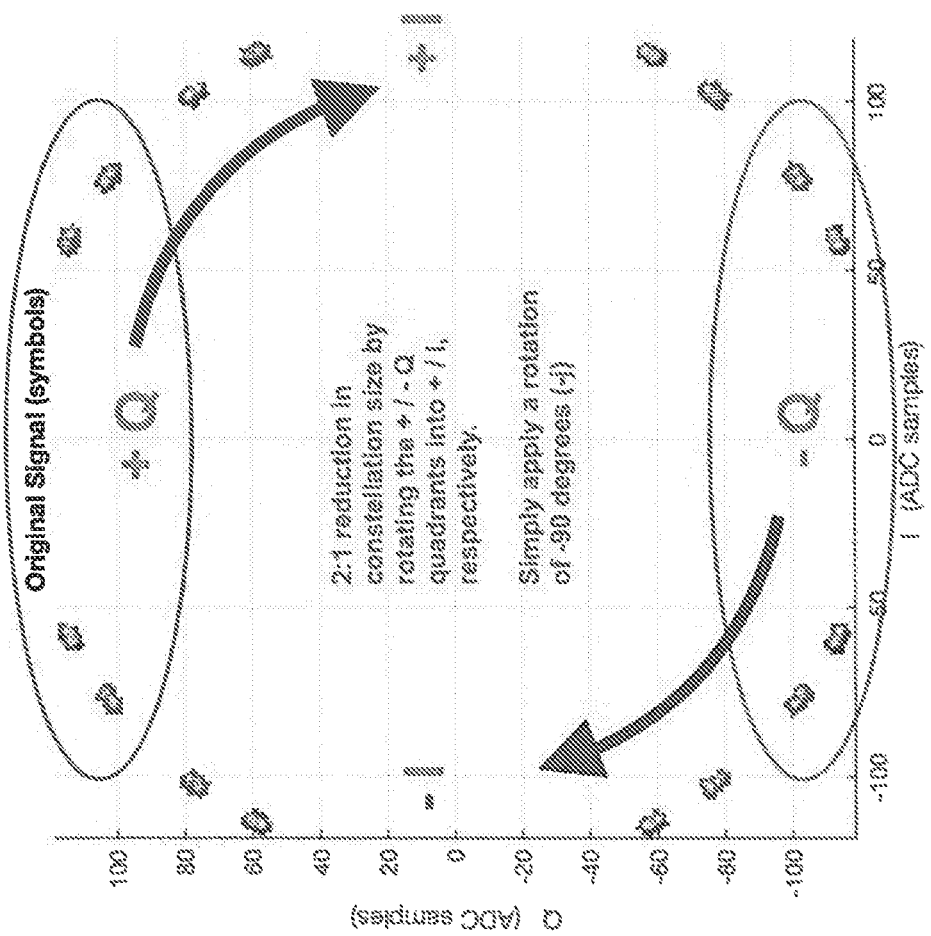
FIG. 21 illustrates an exemplary 90-degree rotation of certain constellation points in accordance with the present invention.
Figure 22:
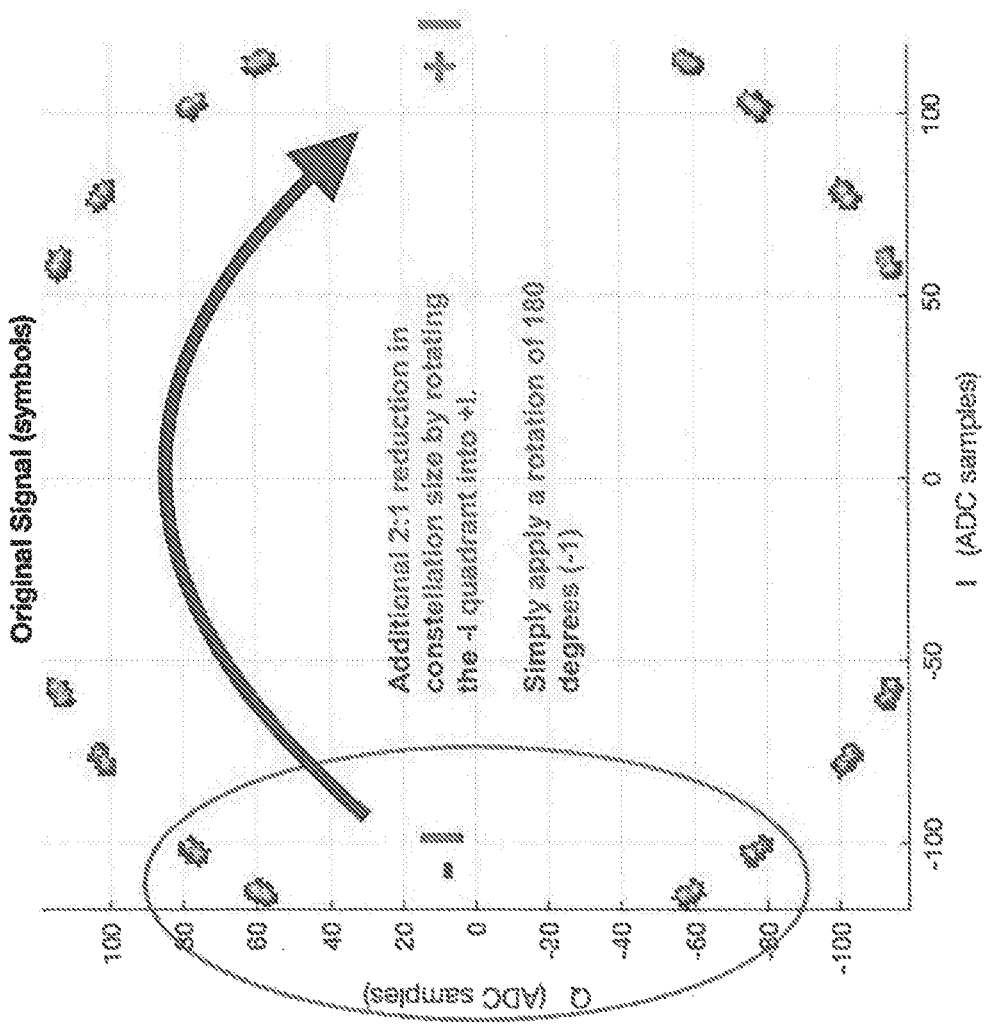
FIG. 22 illustrates an exemplary 180-degree rotation of certain constellation points in accordance with the present invention.

FIG. 21 illustrates the rotation of the constellation points by 90 degrees while FIG. 22 illustrates the rotation of the constellation points by 180 degrees. By exploiting this symmetry, the size of the constellation that is being tracked can be reduced down to 8 different points in this example (from the 32 original points).

Figure 23:
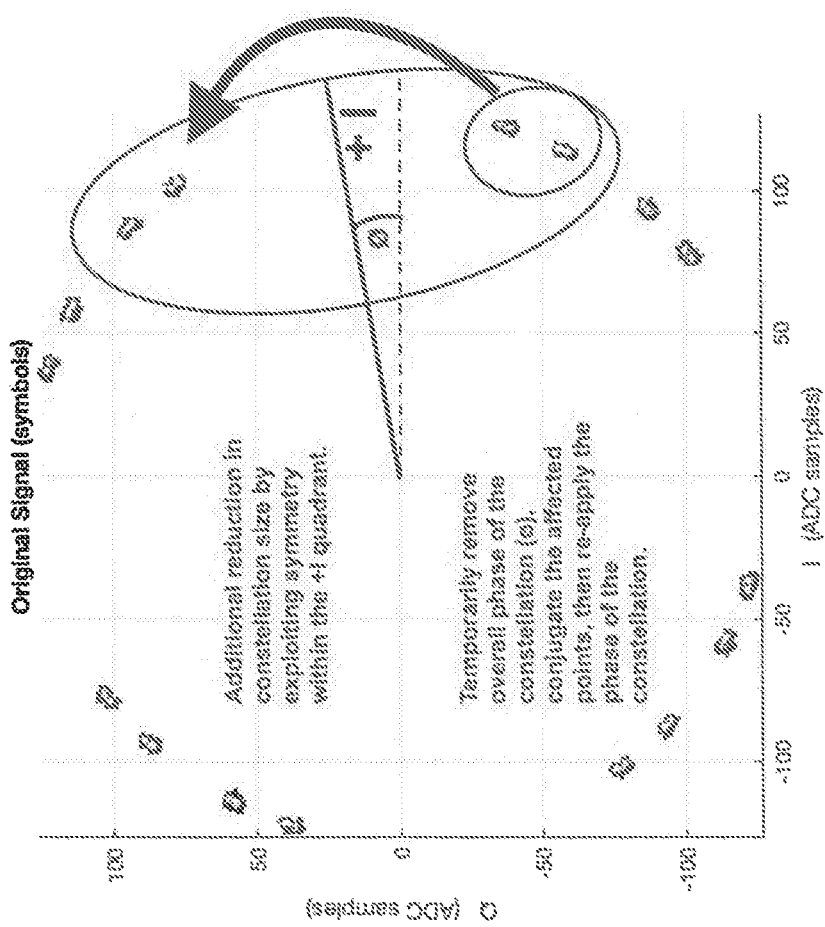
FIG. 23 illustrates an exemplary final symmetry used to reduce the number of constellation points in accordance with the present invention.

Finally, the eight remaining points will have symmetry with respect to an angle $\phi$, shown in the FIG. 23. By estimating the angle $\phi$ and then applying a mirroring operation (flipping over the line with angle $\phi$), the number of constellation points that are tracked can be reduced by another factor of 2. However, this requires an estimate of the phase $\phi$. The phase $\phi$ is tracked in a similar manner to the constellation points. In particular, $\phi(n)=\phi(n-1)+\mu e''(n)$. That is, an estimate of the phase is updated based on the previous estimate, the phase, and the current error term. For the example of 32 points in the constellation, instead of having 32 constellation points to be tracked, only 4 constellation points and one phase are tracked.

Figure 24:
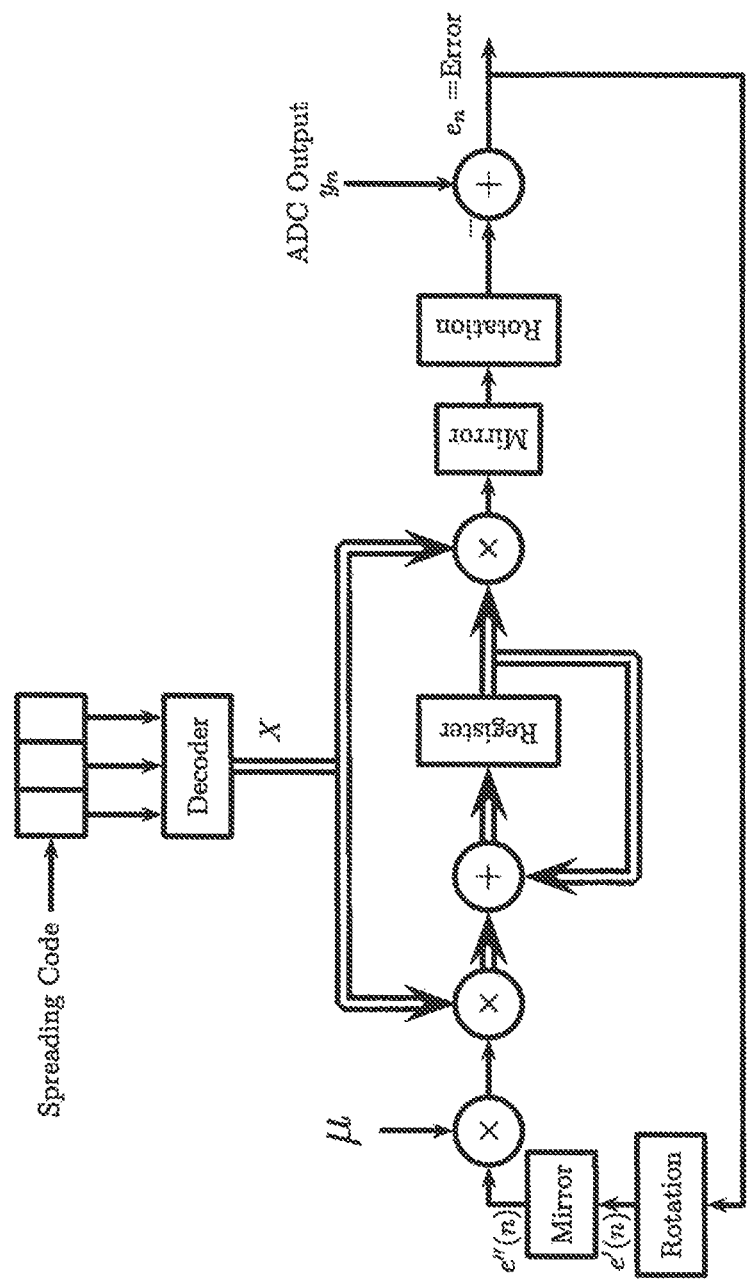
FIG. 24 is a block diagram illustrating an exemplary process that exploits the mirror symmetry in the constellation in accordance with the present invention.

The estimation of the signal due to multiple transmitters and inter-chip interference can also be accomplished by modifying FIG. 21 and incorporating the addition of inter-ference tracked just before the summer that produces the error signal. Such a modification is illustrated in FIG. 24.

By estimating near targets and inter-chip interference effects, the sidelobes can be reduced by on the order of 50 dB. Doing so reveals the further out targets.

Therefore, a radar sensing system is provided with an interference mitigation processor for achieving better performance when there is a nearby object/target and a more distant object/target. The interference mitigation processor processes the sampled stream and estimates parameters of the radio signals reflected from nearby objects/targets and modifies the original radio signal to remove the effect of the interfering object/target. The process is successively repeated for additional objects/targets. Thus, the range and velocity of more distant targets may be accurately estimated even in the presence of a nearby target that would be difficult for a conventional interference mitigation method to mitigate or eliminate. Such a process or system may be applied to a radar system employing a single transmitter and a single receiver, or can be applied to a radar system with multiple transmitters and multiple receivers. Furthermore, the invention described herein, may be applied to radar systems using different types of PMCW including standard binary phase shift keying (BPSK), Gaussian Minimum Shift Keying (GMSK), as well as other modulation techniques.

While parallel operation of the interference mitigation operation has been described herein, this can also be done in a serial way, first estimating the effect of one target and removing that target, then estimating the effect of a second target and removing that target, and so on.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A radar sensing system for a vehicle, the radar sensing system comprising:
   at least one transmitter configured for installation and use on a vehicle, and configured to transmit radio signals;
   at least one receiver configured for installation and use on the vehicle, and further configured to receive radio signals, wherein the received radio signals include transmitted radio signals that are reflected from objects in the environment;
   an interference mitigation processor;
   wherein the at least one receiver is further configured to down-convert and digitize the received radio signal to produce a baseband sampled stream;

wherein the baseband sampled stream is provided to the interference mitigation processor;

wherein the interference mitigation processor, via processing of the baseband sampled stream, determines estimates for reflected radio signals associated with selected objects at one or more ranges, determines estimates for parameters related to corresponding ones of the reflected radio signals, and generates attenuated baseband complex samples corresponding to those selected objects to form an attenuated baseband sampled stream; and wherein the interference mitigation processor is further configured to modify the baseband sampled stream based on the attenuated baseband sampled stream corresponding to the selected objects to remove the effect of the selected objects from the modified baseband sampled stream, and wherein the receiver is configured to use the modified baseband sampled stream to detect at least one more additional object.

2. The radar sensing system of claim 1, wherein the estimate of the parameters includes filters that produce running weighted averages of a plurality of past samples of the generated attenuated baseband complex samples corresponding to a selected set of chips of the different transmitters for a given range or delay.

3. The radar sensing system of claim 1, wherein estimates of the parameters are updated using an error signal generated from previous estimates of the parameters and the baseband sampled stream.

4. The radar sensing system of claim 1, wherein the estimate of the parameters includes filters that produce exponentially weighted filtering of a plurality of past samples of the baseband samples corresponding to a selected set of chips of the different transmitters for a given range or delay.

5. The radar sensing system of claim 1, wherein the interference mitigation processor is further configured to modify the baseband sampled stream based on attenuated baseband complex samples corresponding to one or more additional objects.

6. The radar sensing system of claim 1, wherein the interference mitigation processor only modifies the baseband sampled stream for objects at ranges that are greater than a first threshold range value.

7. The radar sensing system of claim 6, wherein the interference mitigation processor is bypassed for radio signals reflected from objects that are at ranges below a second threshold range value.

8. A radar sensing system for a vehicle, the radar sensing system comprising:

a transmit pipeline comprising a transmitter configured for installation and use on a vehicle and configured to transmit radio signals;

a receive pipeline comprising a receiver configured for installation and use on the vehicle, and further configured to receive radio signals, wherein the received radio signals include reflected radio signals that are transmitted radio signals reflected from objects in the environment;

an interference mitigation processor;

wherein the receiver is further configured to down-convert and digitize the received radio signals to produce a baseband sampled stream;

wherein, responsive to processing by the interference mitigation processor of the baseband sampled stream, the interference mitigation processor produces a second received radio signal that includes reflected radio signals that are transmitted radio signals reflected from a first object in the environment;

wherein the interference mitigation processor is further configured to use the second received radio signal to remove selected samples from the baseband sampled stream that are attributed to radio signals reflected from the first object to produce a modified baseband sampled stream where the effect of the first object has been removed; and wherein the receiver is further configured to use the modified baseband sampled stream to detect a second object that is more distant than the first object.

9. The radar sensing system of claim 8, wherein the transmit pipeline further comprises a plurality of transmitters, and wherein the receive pipeline further comprises a plurality of receivers, and wherein the radar sensing system further comprises a plurality of interference mitigation processors, an interference mitigation processor for each transmitter/receiver pair.

10. The radar sensing system of claim 8, wherein the transmit pipeline further comprises a plurality of transmitters, wherein the receive pipeline further comprises a plurality of receivers, and wherein the interference mitigation processor is further configured to successively remove selected samples from the baseband sampled stream that are attributed to radio signals reflected from the first object that were transmitted by each respective transmitter.

11. The radar sensing system of claim 10, wherein the interference mitigation processor is further configured to determine estimates for reflected radio signals associated with at least the first object, to determine estimates for parameters of the corresponding reflected radio signals, and to generate attenuated baseband complex samples corresponding to at least the first object, such that the interference mitigation processor modifies the baseband sampled stream based on the attenuated baseband samples corresponding to the first object.

12. The radar sensing system of claim 11, wherein the estimate of the parameters includes filters that produce running weighted averages of a plurality of past samples of the baseband samples corresponding to a selected set of chips of the different transmitters for a range or delay associated with the first object.

13. The radar sensing system of claim 11, wherein the estimates of the parameters are updated using an error signal generated from previous estimates of the parameters and an actual baseband sample.

14. The radar sensing system of claim 11, wherein the estimate of the parameters includes filters that produce exponentially weighted filtering of a plurality of past samples of the baseband samples corresponding to a selected set of chips of the different transmitters for a range or delay associated with the first object.

15. The radar sensing system of claim 8, wherein the interference mitigation processor is further configured to only modify the baseband sampled stream for objects at ranges that are more distant than a first threshold value.

16. The radar sensing system of claim 15, wherein the receiver is further configured to bypass the interference mitigation processor and directly process the baseband sampled stream and detect the second object when the second object is at a distance less than a second threshold value.

17. A method for removing interference from a radio signal received by a vehicle radar sensing system, said method comprising:

providing a radar sensing system comprising a transmitter configured for installation and use on a vehicle and configured to transmit radio signals, and a receiver configured for installation and use on the vehicle and configured to receive radio signals, wherein the received radio signals include reflected radio signals that are the transmitted radio signals reflected from objects in the environment;

down-converting and digitizing the received radio signals to produce a baseband sampled stream;

determining estimates for reflected radio signals associated with one or more selected objects at one or more ranges, and determining estimates for parameters of the corresponding reflected radio signals, and generating attenuated baseband complex samples corresponding to those one or more selected objects;

modifying the baseband sampled stream based on the attenuated baseband samples corresponding to the one or more selected objects to remove the effect of those one or more selected objects from the modified baseband sampled stream; and detecting, with the modified baseband sampled stream, at least one more additional object.

18. The method of claim 17, wherein determining estimates of the parameters includes producing running weighted averages of a plurality of past samples of the baseband samples corresponding to a selected set of chips of the different transmitters for a given range or delay.

19. The method of claim 17, wherein the estimates of the parameters are updated using an error signal generated from previous estimates of the parameters and an actual baseband sample.

20. The method of claim 17, wherein determining estimates of the parameters includes producing exponentially weighted filtering of a plurality of past samples of the baseband samples corresponding to a selected set of chips of the different transmitters for a given range or delay.

* * * * *